(12) United States Patent
Murakami et al.

(10) Patent No.: US 8,724,035 B2
(45) Date of Patent: May 13, 2014

(54) RECEIVER APPARATUS FOR RECEIVING A PROGRAM AND SEARCHING A CHANNEL SIMULTANEOUSLY

(75) Inventors: Shinichi Murakami, Yokohama (JP); Takatoshi Shirosugi, Chigasaki (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 13/640,615

(22) PCT Filed: Mar. 23, 2011

(86) PCT No.: PCT/JP2011/057017
§ 371 (c)(1),
(2), (4) Date: Dec. 21, 2012

(87) PCT Pub. No.: WO2011/129184
PCT Pub. Date: Oct. 20, 2011

(65) Prior Publication Data
US 2013/0135534 A1    May 30, 2013

(30) Foreign Application Priority Data
Apr. 13, 2010   (JP) ................................ 2010-092136

(51) Int. Cl.
*H04N 5/50* (2006.01)
(52) U.S. Cl.
USPC ........................................ 348/732; 348/731
(58) Field of Classification Search
USPC ......... 348/731, 732, 725, 565, 192, 193, 706, 348/837; 455/133–136, 140, 161.1–161.3; 375/340; 725/75, 76, 85
See application file for complete search history.

(56) References Cited

U.S. PATENT DOCUMENTS

| | | | |
|---|---|---|---|
| 6,405,372 B1 * | 6/2002 | Kim et al. | 725/50 |
| 6,714,264 B1 * | 3/2004 | Kempisty | 348/732 |
| 6,772,434 B1 * | 8/2004 | Godwin | 725/68 |
| 7,369,823 B2 * | 5/2008 | Oiwa | 455/135 |
| 7,373,650 B1 * | 5/2008 | Rodriguez et al. | 725/41 |
| 7,428,022 B2 * | 9/2008 | Teichner et al. | 348/725 |

(Continued)

FOREIGN PATENT DOCUMENTS

| | | |
|---|---|---|
| JP | 2004-320406 A | 11/2004 |
| JP | 2006-166011 A | 6/2006 |

(Continued)

OTHER PUBLICATIONS

PCT International Search Report on application PCT/JP2011/057017 mailed May 17, 2011,1 page.

*Primary Examiner* — Victor Kostak
(74) *Attorney, Agent, or Firm* — Foley & Lardner LLP

(57) ABSTRACT

Receiver apparatus comprises: first and second receiving systems; a demodulation/diversity combining means for combining demodulated signals of first and second receiving systems; a selection means for selecting and outputting an output of either one of first and second receiving systems; and a control means for controlling the operations of the whole receiver apparatus. Control means causes to execute a first composite operation, either one of the receiving systems is caused to continue reception operation while the other receiving system is caused to perform channel search to search a channel satisfying a predetermined condition, further the selection means is caused to select output of the resulting receiving system for performing continuous reception operation. If no channel to be received is found, the control means controls to interchange the receiving system for performing continuous reception operation and the receiving system for performing channel search, and to perform a second composite operation.

9 Claims, 13 Drawing Sheets

(56) References Cited

U.S. PATENT DOCUMENTS

| | | | |
|---|---|---|---|
| 7,952,648 B2 * | 5/2011 | Yamamoto et al. | 348/731 |
| 2002/0163593 A1 * | 11/2002 | Liu et al. | 348/614 |
| 2006/0227255 A1 * | 10/2006 | Yang | 348/837 |
| 2006/0277573 A1 * | 12/2006 | Kinemura | 725/39 |
| 2008/0012990 A1 * | 1/2008 | Kitamura et al. | 348/607 |
| 2008/0098439 A1 | 4/2008 | Taura et al. | |
| 2008/0136971 A1 * | 6/2008 | Fujishima et al. | 348/731 |
| 2009/0021641 A1 * | 1/2009 | Matsuura et al. | 348/553 |
| 2011/0158357 A1 * | 6/2011 | Djadi et al. | 375/344 |
| 2012/0133840 A1 * | 5/2012 | Shirasuka et al. | 348/732 |

FOREIGN PATENT DOCUMENTS

| | | |
|---|---|---|
| JP | 2008-160422 A | 7/2008 |
| JP | 2009-088824 A | 4/2009 |
| JP | 2010-028186 A | 2/2010 |

* cited by examiner

FIG. 8

801 YAMAGATA / AKITA / MIYAGI

| BROADCAST STATION | AFFILIATE IDENTIFIER | TRANSMISSION CHANNEL | | | | | | |
|---|---|---|---|---|---|---|---|---|
| NHK GENERAL/SENDAI | 0 | 15 | 17 | 18 | 22 | 25 | 26 | 42 |
| NHK EDUCATIONAL/SENDAI | 1 | 13 | 14 | 16 | 23 | 26 | 30 | 40 |
| TBC TELEVISION | 3 | 18 | 19 | 22 | 23 | 27 | 44 | 45 |
| ... | ... | ... | | | | | | |
| KHB HIGASHI NIPPON BROADCASTING | 5 | 16 | 20 | 28 | 30 | 43 | 50 | 51 |

802

| AREA | NEIGHBORING AREA |
|---|---|
| MIYAGI | IWATE, FUKUSHIMA, YAMAGATA |
| AKITA | IWATE, YAMAGATA, AOMORI |
| YAMAGATA | MIYAGI, NIIGATA, AKITA, FUKUSHIMA |

RECEIVER APPARATUS FOR RECEIVING A PROGRAM AND SEARCHING A CHANNEL SIMULTANEOUSLY

TECHNICAL FIELD

The present invention relates to receiver apparatuses receiving communications and broadcasts, and in particular relates to a receiver apparatus mounted on a movable body and receiving terrestrial digital broadcasts while moving.

BACKGROUND ART

Usually, a broadcast station expands the receiving area of broadcasting by installing a relay station at a plurality of locations within a broadcast area and sending broadcast radio waves from these relay stations. If a relay station sends a broadcast radio wave at the same frequency (SFN: Single Frequency Network), a program can be continuously viewed even if a movable body moves to other receiving area However, if a relay station sends a broadcast radio wave at different frequency (MFN: Multi Frequency Network), when a movable body moves to other receiving area, a program that has been viewed till then cannot be received.

For this reason, particularly in a broadcast receiver apparatus mounted on a movable body, such as a car, when it moves to other receiving area and cannot receive a program that has been viewed, there is a need to carry out channel search, search the broadcast radio wave of a receivable relay station and reestablish the channel in order to continuously view the program. While carrying out this channel search, there is an inconvenience that the program cannot be viewed.

In view of the above circumstances, conventionally, for example, an automatic channel selecting method for terrestrial digital broadcasting has been proposed, wherein the digital broadcasting for each area is continuously selected even if a movable body moves between broadcasting areas (see Patent Literature 1). In this conventional art, a receiver with a diversity antenna having a double tuner mounted thereon is used, and the reception is carried out using a signal of a tuner having a better receiving state among two tuners. When the radio wave is stable, the channel search is carried out using one of the tuners and all the channel information of a receiving area are stored into a channel memory of the receiver. Moreover, the channel information of a neighboring area is broadcast, and this information is received by one of the two tuners and the channel information of a neighboring area is stored, thereby enabling seamless broadcast reception without searching the broadcasting channel of this area when moves to the neighboring area.

CITATION LIST

Patent Literature

Patent Literature 1 JP-A-2004-320406

SUMMARY OF INVENTION

Technical Problem

In a broadcast receiver apparatus mounted on a movable body, such as a car, diversity reception using a plurality of antennas is carried out in order to stably receive a broadcast radio wave even while running. In the diversity reception, the respective antennas are disposed at locations as far away from each other as possible so that the reception signals of the respective antennas become noncorrelated. Moreover, depending on the method of mounting each antenna, the direction of the reception directivity of each antenna, or the angle of a received polarized-wave, or the like differs and thus the receiving state of a broadcast radio wave received by each antenna differs.

However, in the above-described conventional art, because the reception is continued by a tuner having a good receiving state and the channel search is carried out by the remaining tuner, the broadcast radio wave of a relay station might not be successfully received by the antenna of the tuner for channel search and thus the relay station might not be found even if the channel search is carried out, The present invention has been made in view of the above circumstances, and provides a receiver apparatus which, when the receiving state of the radio wave of a viewed program deteriorates, can continuously view the program even if moved to other receiving area by searching a receivable relay station while continuing to view the program.

Solution to Problem

According to an aspect of the present invention for achieve the above-described purpose, for example, there is provided a receiver apparatus including first and second receiving systems that transmit a reception signal received by an antenna, the receiver apparatus being capable of a diversity reception operation using a composite signal of demodulated signals demodulated by the first and second receiving systems. Here, the receiver apparatus further includes a control means for: executing a first composite operation, wherein when a predetermined condition has been satisfied during the diversity reception operation, either one of the first and second receiving systems is caused to continuously receive a program selected by the first and second receiving systems while the other one is caused to carry out channel search or acquire an EPG about a channel registered in the receiver apparatus; and executing a second composite operation, wherein when a channel to be received has not been found in the first composite operation, the first and second receiving systems are interchanged, and either one of the first and second receiving systems is caused to perform a channel search while the other one is caused to continuously receive the program.

Advantageous Effects of Invention

According to the present invention, when the receiving state of the radio wave of a viewed program deteriorates, a receivable relay station is searched while continuing to view the program, thereby allowing the program to be continuously viewed even if moved to other receiving area.

BRIEF DESCRIPTION OF DRAWINGS

FIG. 8 is a view showing the contents of a broadcast station data base stored in the control unit 18 of FIG. 7.

DESCRIPTION OF EMBODIMENTS

Figure 1:
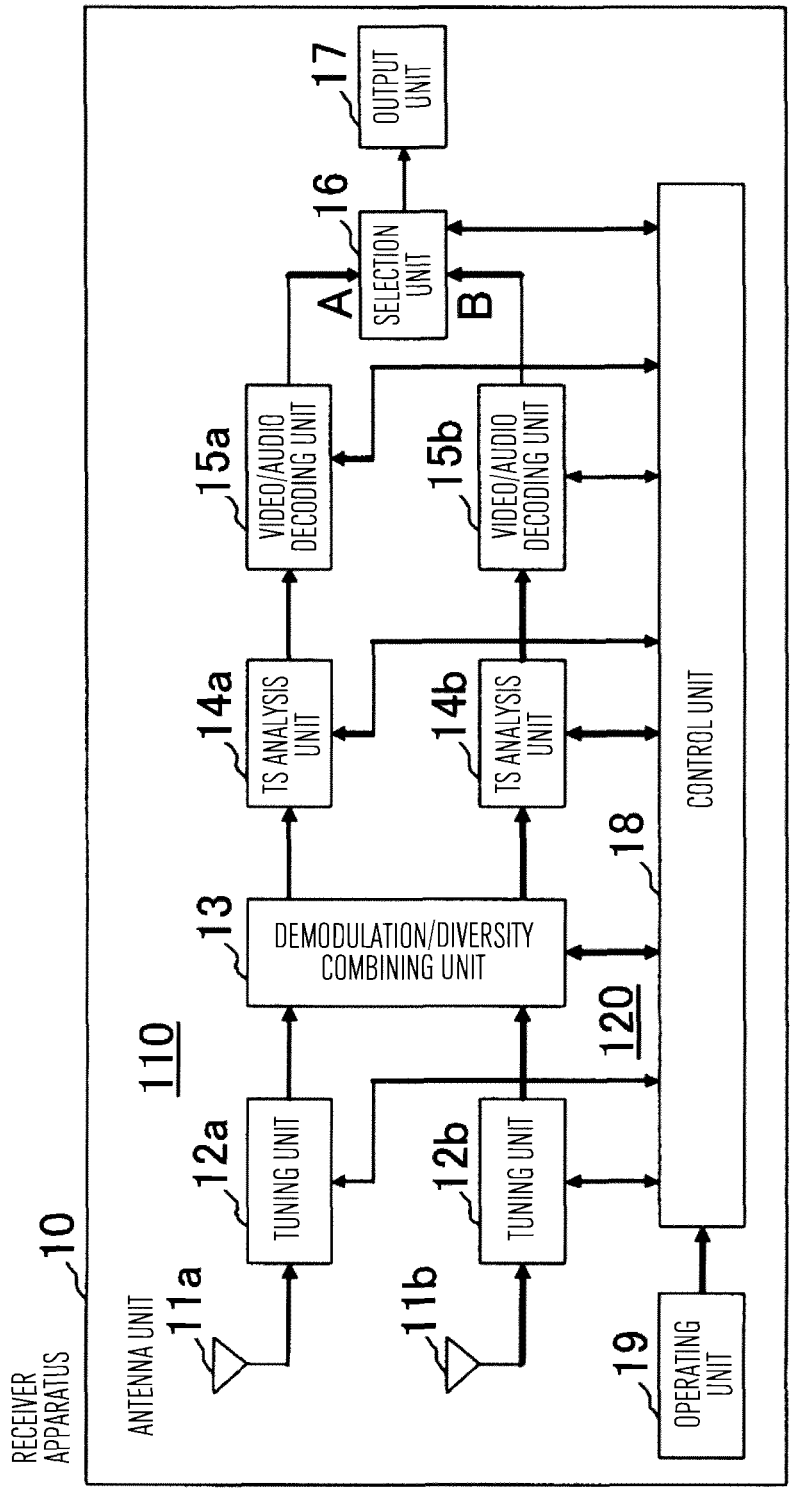
FIG. 1 is a block diagram showing the configuration of a receiver apparatus 10 in a first embodiment of the present invention.

The present invention is conceptually configured as follows, for example. That is, a receiver apparatus comprises: a first receiving system that selects a predetermined channel using a reception signal received by an antenna, performs demodulation/channel decoding/demultiplexing/decoding processings, and outputs video and audio signals; a second receiving system that selects a predetermined channel using a reception signal received by an antenna, performs demodulation/channel decoding/demultiplexing/decoding processings, and outputs video and audio signals; a select son means for selecting and outputting either one of the output of the first receiving system and the output of the second receiving system; and a control means for controlling the operation of the whole receiver apparatus. Here, the control means can cause to perform a diversity reception operation of: combining a demodulated signal of the first receiving system and a demodulated signal of the second receiving system; performing channel decoding demultiplexing/decoding processings on a resulting composite signal using one of the receiving systems; and outputting video and audio signals. The control means, when a predetermined condition has been satisfied during the diversity reception operation, executes a first composite operation, wherein either one of the first receiving system and the second receiving system is caused to continuously receive a viewed program as it is while the other receiving system is caused to perform a channel search to search a channel satisfying a predetermined condition, and further the selection means is caused to select the output of a receiving system for continuously receiving the viewed program. When a channel to be received has not been found as a result of the first composite operation, the control means executes a second composite operation, wherein the receiving system for continuously receiving the viewed program and the receiving system for performing the channel search are interchanged, and the resulting receiving system for performing the channel search is caused to perform the channel search, and further the selection means is caused to select an output of the resulting receiving system for continuously receiving the viewed program.

Moreover, a receiver apparatus comprises: a first receiving system that selects a predetermined channel using a reception signal received by an antenna, performs demodulation/channel decoding/demultiplexing/decoding processings, and outputs video and audio signals; a second receiving system that selects a predetermined channel using a reception signal received by an antenna, performs demodulation/channel decoding/demultiplexing/decoding processings, and outputs video and audio signals; a selection means for selecting and outputting either one of the output of the first receiving system and the output of the second receiving system; and a control means for controlling the operation of the whole receiver apparatus. Here, the control means can cause to perform a diversity reception operation of: combining a demodulated signal of the first receiving system and a demodulated signal of the second receiving system; performing channel decoding/demultiplexing/decoding processings on a resulting composite signal using one of the receiving systems; and outputting video and audio signals. The control means, when a predetermined condition has been satisfied during the diversity reception operation, executes a first composite operation, wherein either one of the first receiving system and the second receiving system is caused to continuously receive a viewed program as it is while the other receiving system is caused to perform a channel search to search a channel satisfying a predetermined condition, and further the selection means is caused to select an output of a receiving system for performing the continuous reception operation. When a channel to be received has not been found as a result of the first composite operation, the control means executes a second composite operation, wherein when the receiving system for continuously receiving the viewed program and the receiving system for performing the channel search are interchanged, it is determined whether or not the viewed program can be received by the receiving system for continuously receiving the viewed program, and only if it is determined that the viewed program can be received, the receiving system for continuously receiving the viewed program and the receiving system for performing the channel search are actually interchanged, and the resulting receiving system for performing the channel search is caused to perform a channel search, and the resulting selection means is caused to select an output of the resulting receiving system for continuously receiving the viewed program.

Moreover, the control means sets a plurality of threshold values for determining the receiving state of a viewed program, and a time interval value for carrying out numerical count per between the plurality of threshold values. During the diversity reception operation, while the receiving state of a viewed program is transitioning between the plurality of threshold values, the control means carries out the numerical counting in accordance with the time interval value, and starts the first composite operation when the numerical count reaches a predetermined numerical value.

Moreover, a channel satisfying a predetermined condition, which is to be searched in the channel search, is a channel of a relay station or an affiliate station of a channel which the receiving system having been continuously receiving the viewed program is currently receiving, wherein the receiving state of the above-described relay station or affiliate station is better than the receiving state of the channel which the receiving system has been continuously receiving the viewed program is currently receiving Moreover, in the first composite operation, among the first receiving system and the second receiving system, a receiving system having a better receiving state is set to the receiving system for continuously receiving the viewed program and the other receiving system is set to the receiving system for performing the channel search.

A receiver apparatus comprises: a first receiving system that selects a predetermined channel using a reception signal received by an antenna, performs demodulation/channel decoding/demultiplexing/decoding processings, and outputs video and audio signals; a second receiving system that selects a predetermined channel using a reception signal received by an antenna, performs demodulation/channel decoding/demultiplexing/decoding processings, and outputs video and audio signals; a selection means for selecting and outputting either one of the output of the first receiving system and the output of the second receiving system; and a control means for controlling the operation of the whole receiver apparatus. Here, the control means can cause to perform a diversity reception operation of: combining a demodulated signal of the first receiving system and a demodulated signal of the second receiving system; performing channel decoding demultiplexing/decoding processings on a resulting composite signal using one of the receiving systems; and outputting video and audio signals. The control means, when a predetermined condition has been satisfied during the diversity reception operation, executes a first composite operation, wherein among the first receiving system and the second receiving system, one of the receiving systems is caused to continuously receive a viewed program as it is while the other receiving system is caused to perform a channel scan to search a receivable channel, and also the selection means is caused to select the output of a receiving system for continuously receiving the viewed program. Subsequently, the control means executes a second composite operation, wherein the receiving system for continuously receiving the viewed program and the receiving system for performing the channel search are interchanged, and the resulting receiving system for performing the channel search is caused to perform the channel scan, and the selection means is caused to select an output of the resulting receiving system for continuously receiving the viewed program.

A receiving apparatus comprises: a first receiving system that selects a predetermined channel using a reception signal received by an antenna, performs demodulation/channel decoding/demultiplexing/decoding processings, and outputs video and audio signals, a second receiving system that selects a predetermined channel using a reception signal received by an antenna, performs demodulation/channel decoding/demultiplexing/decoding processings, and outputs video and audio signals, a selection means for selecting and outputting either one of the output of the first receiving system and the output of the second receiving system: and a control means for controlling the operation of the whole receiver apparatus. Here, the control means can cause to perform a diversity reception operation of: combining a demodulated signal of the first receiving system and a demodulated signal of the second receiving system; performing channel decoding/demultiplexing/decoding processings on a resulting composite signal using one of the receiving systems, and outputting video and audio signals. The control means, when a predetermined condition has been satisfied during the diversity reception operation, executes a first composite operation, wherein among the first receiving system and the second receiving system, one of the receiving systems is caused to continuously receive a viewed program as it is while the other receiving system is caused to acquire an EPG about a channel registered in the receiver apparatus, and the selection means is caused to select the output of the receiving system for continuously receiving the viewed program. When as a result of the first composite operation, the EPG about all the channels registered in the receiver apparatus could not acquired, the control means executes a second composite operation, wherein the receiving system for continuously receiving the viewed program, and the receiving system for acquiring the EPG are interchanged, the resulting receiving system for acquiring the EPG is caused to acquire an EPG about a channel that could not acquired in the first composite operation, and the selection means is caused to select an output of the resulting receiving system for continuously receiving the viewed program.

A receiving apparatus comprises: a first receiving system that selects a predetermined channel using a reception signal received by an antenna, performs demodulation/channel decoding/demultiplexing/decoding processings, and outputs video and audio signals; a second receiving system that selects a predetermined channel using a reception signal received by an antenna, performs demodulation/channel decoding/demultiplexing/decoding processings, and outputs video and audio signals; a selection means for selecting and outputting either one of the output of the first receiving system and the output of the second receiving system; and a control means for controlling the operation of the whole receiver apparatus. Here, the control means can cause to perform a diversity reception operation of: combining a demodulated signal of the first receiving system and a demodulated signal of the second receiving system: performing channel decoding/demultiplexing/decoding processings on a resulting composite signal using one of the receiving systems; and outputting video and audio signals. When a predetermined condition has been satisfied during the diversity reception operation, the control means executes a first composite operation, wherein among the first receiving system and the second receiving system, one of the receiving systems is caused to continuously receive a viewed program as it is while the other receiving system is caused to perform a channel search to acquire a receiving state of each channel and search a channel satisfying a predetermined condition, and the selection means is caused to select the output of the receiving system for continuously receiving the viewed program. Subsequently, the control means executes a second composite operation, wherein the receiving system for continuously receiving the viewed program and the receiving system for performing the channel search are interchanged, the resulting receiving system for performing the channel search is caused to perform the channel search to acquire a receiving state of each channel and search a channel satisfying a predetermined condition, and the selection means is caused to select an output of the resulting receiving system for continuously receiving the viewed program. Then, the control means combines, for each channel, the receiving state of the each channel obtained by the first composite operation and the second composite operation, and calculates the receiving state of after combining, and sets the channel of a viewed program to a channel, the receiving state of which after combining is the best, among the channels satisfying the predetermined condition.

Note that, "satisfying a predetermined condition during a diversity reception operation" indicates the receiving state of the radio wave of a viewed program or the like, and refers to, for example, the case where the received radio wave deteriorates and a condition to start the channel search is reached, specifically the case where a signal quality value described later becomes less than a predetermined threshold value or becomes greater than a threshold value (or a period, during which the signal quality value is greater than a predetermined threshold value, continues for a predetermined period) or the like.

Hereinafter, the embodiments of the above conceptional invention will be described in detail with reference to the accompanying drawings, math a transmission system of terrestrial digital broadcasting in Japan taken as an example. Note that, the receiver apparatus in the embodiments of the present invention can receive broadcast signals of ISDB-T (Integrated Services Digital Broadcasting for Terrestrial) that is the transmission system of terrestrial digital broadcasting in Japan, and decode the video/audio signals in the form of MPEG2-TS (Transport Stream) (hereinafter, referred to as a TS signal). In ISDB-T, hierarchical transmission of up to three hierarchical layers can be carried out by dividing one channel of transmission band into 13 segments and combining the respective segments.

At present, by utilizing this hierarchical transmission, a high quality broadcast for fixed receiving terminals using 12 segments (hereinafter, referred to as 12-segment broadcast) and a low quality broadcasting for portable receiving terminals using one remaining segment (hereinafter, referred to as one-segment broadcast) are carried out. In the 12-segment broadcast and the one-segment broadcast, simultaneous broadcast (Simulcast) for broadcasting the same program content is the main stream. Here, the 12-segment broadcast is a broadcast with a large transmission capacity and high quality, but has a weak error-resistance and cannot receive a broadcast radio wave unless the receiving state of a broadcast radio wave is relatively good On the other hand, the one-segment broadcast is a broadcast with a small transmission capacity and low quality, but has a strong error-resistance and can receive a broadcast radio wave even if the receiving state of a broadcast radio wave relatively deteriorates. Moreover, the simulcast refers to that one broadcast station simultaneously broadcasts completely the same content by means of two or more different media (or broadcast waves). The receiver apparatus in the embodiments of the present invention has a function to receive both the 12-segment broadcast and the one-segment broadcast, and can select either one of the video/audio signals of the 12-segment broadcast or the one-segment broadcast depending on whether the receiving state of a broadcast radio wave is good or bad, and output the same to a display, a speaker, or the like.

Embodiment 1

FIG. 1 is a block diagram showing the configuration of a receiver apparatus 10 in a first embodiment of the present invention.

In this view, a first receiving circuit unit 110 constitutes a first receiving system. The first receiving circuit unit 110 includes an antenna unit 11a, a tuning unit 12a, a demodulation/diversity combining unit 13, a TS analysis unit 14a, and a video/audio decoding unit 15a. The antenna unit 11a receives broadcast radio waves, and supplies the same to the tuning unit 12a. The tuning unit 12a extracts, among the supplied broadcast radio waves, a channel specified by a control unit 18 to be described later and performs a frequency conversion processing on the extracted channel, and supplies a desired channel signal to the demodulation/diversity combining unit 13.

Moreover, a second receiving circuit unit 120 constitutes a second receiving system. The second receiving circuit unit 120 includes an antenna unit 11b, a tuning unit 12b, the demodulation/diversity combining unit 13, a TS analysis unit 14b, and a video/audio decoding unit 15b. The antenna unit 11b and the tuning unit 12b have the same configuration as the antenna unit 11a and the tuning unit 12a, respectively, so the description thereof is omitted.

The demodulation/diversity combining unit 13 carries out OFDM (Orthogonal Frequency Division Multiplexing) demodulation and channel decoding on the respective channel signals supplied from the tuning units 12a and 12b to extract the TS signals. The respective extracted TS signals are output to the TS analysis units 14a and 14b.

Moreover, the demodulation/diversity combining unit 13 not only can independently process the supplied channel signal as described above, but can carry out a diversity combining processing on the two supplied channel signals. Specifically, for a plurality of sub-carriers extracted in the course of the respective OFDM demodulations, a maximum ratio combining method of weighting and combining for each sub-carrier is used The TS signal extracted by the diversity combining processing is output to either one of the TS analysis unit 14a or 14b according to an instruction from the control unit 18.

However, the above-described diversity combining method is not limited to the maximum ratio combining method, but for example, a selective combining method of selecting a channel signal having the maximum power and discarding the other channel signals, an equal-gain combining method of equalizing the phases of the respective channel signals and combining the resulting channel signals, and the like can be used.

Furthermore, the demodulation/diversity combining unit 13, in carrying out the OFDM demodulation and the channel decoding, periodically extracts information (hereinafter, referred to as a signal quality value) indicative of the quality of a received signal, such as BER (Bit Error Rate), PER (Packet Error Rate), CNR (Carrier to Noise Ratio), a received power, or a synchronized state, and supplies the same to the control unit 18.

The TS analysis unit 14a extracts, among the TS signals supplied from the demodulation, diversity combining unit 13, a TS packet containing video and audio signals, and supplies the same to the video/audio decoding unit 15a. Moreover, in accordance with an instruction from the control unit 18, the TS analysis unit 14a extracts information, such as PSI/SI (Program Specific Information/Service Information), from the TS packet and supplies the same to the control unit 18. The TS analysis unit 14b has the same configuration as the TS analysis unit 14a, so the description thereof is omitted.

The video/audio decoding unit 15a decodes the TS packet of video and audio signals supplied from the TS analysis unit 14a, and supplies the decoded video/audio signals to the selection unit 16. The video/audio decoding unit 15a is capable of decoding both the 12-segment broadcast encoded by MPEG-2 (Moving Picture Experts Group 2) and the one-segment broadcast encoded by H. 264. The video/audio decoding unit 15a supplies either one of the video and audio signals of the 12-segment broadcast and the one-segment broadcast to the selection unit 16 in accordance with an instruction from the control unit 18. The control unit 18 comprises, for example, a control means including a CPU.

Note that, which the control unit 18 selects, the 12-segment broadcast or the one-segment broadcast, may be determined as follows, for example. First, when the control unit 18 is currently selecting the 12-segment broadcast, the 12-segment broadcast is switched to the one-segment broadcast if the signal quality value supplied from the demodulation/diversity combining unit 13 becomes less than a predetermined threshold value. Next, when the control unit 18 is currently selecting the one-segment broadcast, the one-segment broadcast is switched to the 12-segment broadcast if the signal quality value becomes equal to or greater than the predetermined threshold value (or if a period, during which the signal quality value is greater than the predetermined threshold value, continues for a predetermined period). However, here, assume that the larger the signal quality value, the better the receiving state of a broadcast radio wave becomes, and that the smaller the signal quality value, the worse the receiving state becomes. The video/audio decoding unit 15b has the same configuration as the video/audio decoding unit 15a, so the description thereof omitted.

The selection unit 16, in accordance with an instruction from the control unit 18, selects either one of the video/audio signals supplied from the video/audio decoding unit 15a (hereinafter, referred to as the video/audio signals on an A side) or the video/audio signals supplied from the video/audio decoding unit 15b (hereinafter, referred to as the video/audio signals on a B side), and supplies the result to the output unit 17.

The output unit 17 comprises a display, a speaker, and the like, and displays the supplied video signal on the display. Moreover, the supplied audio signal is output by the speaker.

The control unit 18 controls the entire operation of the receiver apparatus 10 as described later.

An operating unit 19 comprises a channel selection button displayed on the display of the output unit 17, or a channel selection button of a remote control unit. When a user performs a channel selection operation using these, the channel selection information will be supplied to the control unit 18.

Figure 2:
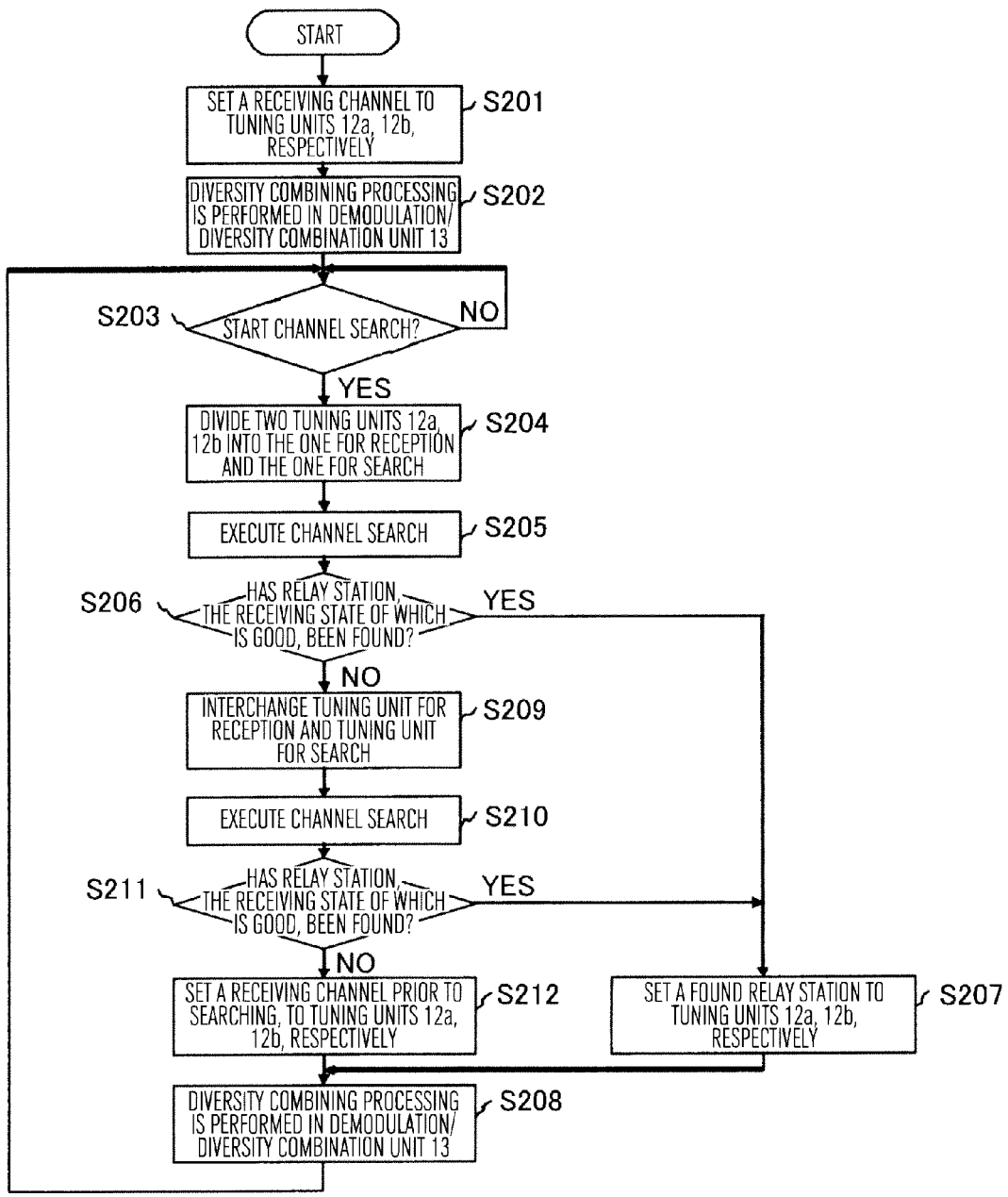
FIG. 2 is a flow chart showing the operation of a control unit 18 of FIG. 1.

Hereinafter, a digital broadcast receiving processing by the receiver apparatus 10 is specifically described using FIG. 2. FIG. 2 is a flow chart showing the operation of the control unit 18.

In this view, when a user's channel selection operation is carried out and the channel selection information associated with a selection button operation of the operating unit 19 is supplied to the control unit 18, the control unit 18 will start each processing in accordance with this flow chart.

First, in Step S201, the control unit 18 sets a corresponding receiving channel to the tuning units 12a and 12b, respectively, based on the channel selection information supplied from the operation unit 19.

Next, in Step S202, the control unit 18 causes the demodulation/diversity combining unit 13 to perform a diversity combining processing and output the extracted TS signal to the TS analysis unit 14a. Moreover, the control unit 18 causes the selection unit 16 to select the video/audio signals on the A side. By the above-described processing, a user can view a desired broadcast program while carrying out the diversity reception operation with the use of two antennas 11a and 11b.

Subsequently, in Step S203, the control unit 18 determines whether or not a condition to start the channel search has been satisfied, and when the condition to start the channel search has been satisfied, the flow; proceeds to Step S204, while when the condition to start the channel search has not been satisfied, the determination of Step S203 will be repeated.

Figure 3:
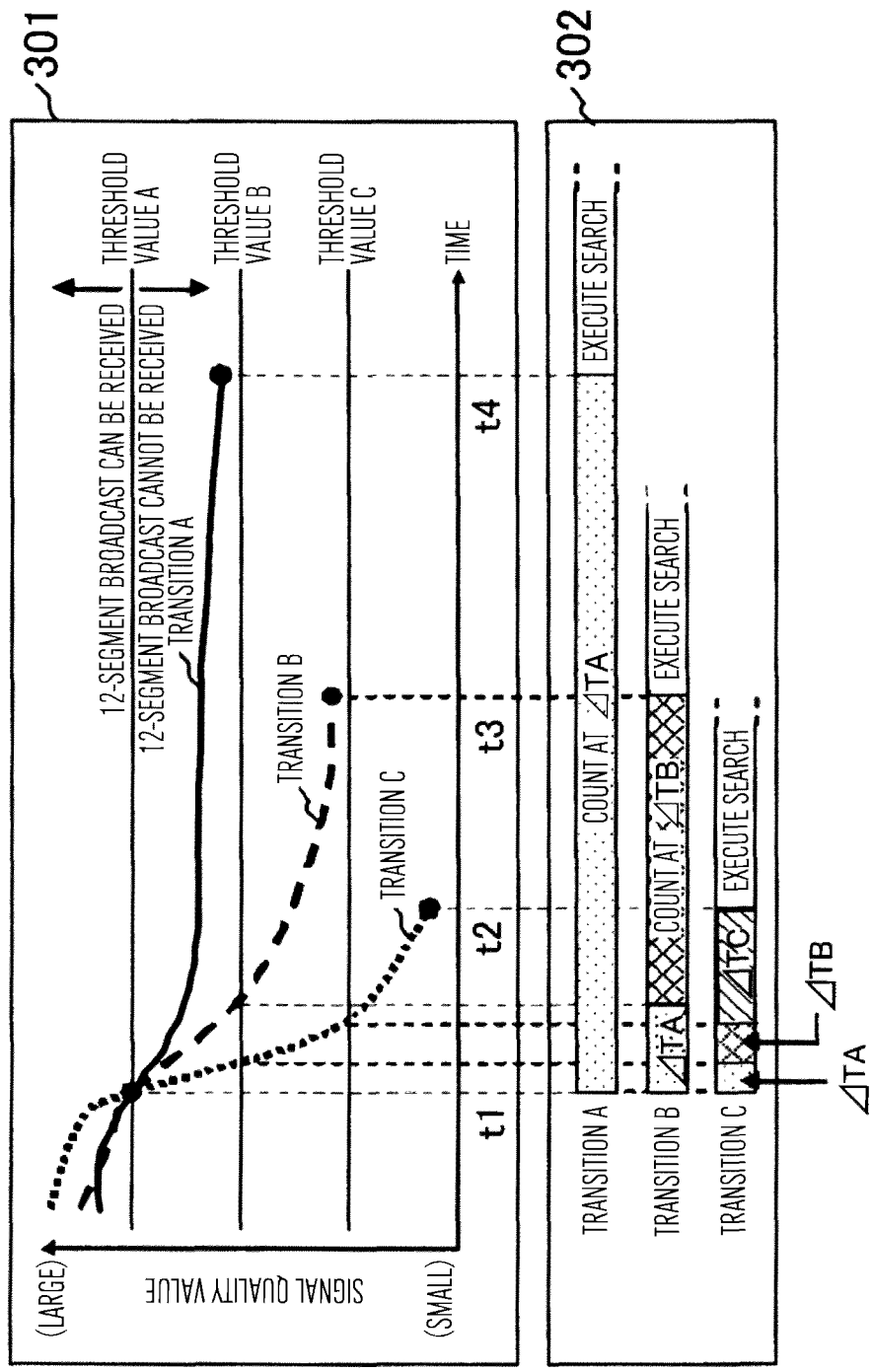
FIG. 3 is a view illustrating a determination processing of Step S203 in FIG. 2.

FIG. 3 is a view illustrating the determination processing of Step S203. In this view, a graph 301 shows a temporal change of the signal quality value in three cases of transitions A, B, and C, respectively. Moreover, in the graph 301, threshold values A, B, and C each corresponding to a magnitude of the signal quality value are set, where the threshold value A>threshold value B>threshold value C. Here, the threshold value A is a value to such a degree to be the minimum signal quality value at which the 12-segment broadcast can be received, and is also the same as the threshold value that is used in determining to switch from the 12-segment broadcast to the one-segment broadcast. Moreover, in the graph 301, for simplicity of description, the time instance at which the transitions A, B, and C become smaller than the threshold value A is set to the same time instance t1. In a graph 302, the temporal change of the signal quality value indicates the start timing of channel search for the respective cases of the transitions A, B, and C.

The control unit 18 starts a numerical counting at a time point when the signal quality value becomes less than the threshold value A, for example, at a time point when a viewed program switches from the 12-segment broadcast to the one-segment broadcast. For the numerical counting, the time interval during which the numerical counting is performed differs according to the magnitude of the signal quality value. Moreover, when the signal quality value is equal to or greater than the threshold value B and is less than the threshold value A, the numerical counting is carried out at a predetermined time interval (denoted by $\Delta TA$). When the signal quality value is equal to or greater than the threshold value C and is less than the threshold value B, the numerical counting is carried out at a time interval (denoted by $\Delta TB$) that is less than $\Delta TA$. When the signal quality value is less than the threshold value C, the numerical counting is carried out at a time interval (denoted by $\Delta TC$) that is less than $\Delta TB$. Then, at a time point when the numerical counting reaches a predetermined number of counts, the channel a search is started. Here, $\Delta$ represents delta. Hereinafter, the same is true.

In this manner, the time interval ($\Delta TA > \Delta TB > \Delta TC$) of the numerical counting is changed according to the signal quality value, so that the greater the drop of the signal quality value, the shorter the time until the channel search is started becomes. Accordingly, when the deterioration of the receiving state is relatively small, the receiving state is more likely to shift to a favorable state and thus the timing to start the channel search is extended in advance, so that for example when the receiving state significantly deteriorates, the channel search is executed earlier so as to be able to switch to a channel of a relay station even if a viewed program becomes unable to be received.

On the other hand, the timing to start the channel search can be changed also by setting $\Delta TA$, $\Delta TB$, and $\Delta TC$ to an arbitrary value, respectively. For example, when the receiving state of a broadcast radio wave abruptly deteriorates because a viewer enters a tunnel during traveling by a car or a viewer enters a shadow of a building or goes under an elevating structure, the chances that the receiving state will improve again are high after passing through these tunnel and elevating structure. In this manner, in order to avoid the occurrence of the channel search due to a temporal deterioration of the receiving state of a broadcast radio wave, the time intervals may be set as $\Delta TA < \Delta TB < \Delta TC$.

By the above-described processing, when the condition to start the channel search has been satisfied in Step S203, in Step S204 the control unit 18 assigns either one tuning unit of the tuning unit 12a or 12b to the one for continuously receiving, and assigns the other tuning unit to the one for executing the channel search. As this assigning method, the demodulation/diversity combining unit 13 may calculate CNR of the respective channel signals of the tuning units 12a and 12b, and use a tuning unit having a higher CNR as the one for reception and use a tuning unit having a lower CNR as the one for search. However, the assigning of the tuning units may be determined using other signal quality value besides CNR In this manner, by using a tuning unit having a better receiving state of a broadcast radio wave as the one for reception, the deterioration of the receiving performance can be suppressed as much as possible even without carrying out the diversity reception.

Hereinafter, the operation procedure of the channel search in Step S205 is described. Here, as an example, in Step S204, assume the tuning unit 12a has been assigned to the one for reception and the tuning unit 12b to the one for search.

First, the control unit 18 causes the demodulation/diversity combining unit 13 to stop the diversity combining processing and independently subject the respective channel signals supplied from the tuning units 12a and 12b to the demodulation and the channel decoding processings.

Next, the control unit 18 acquires NIT (Network Information Table) information from the TS analysis unit 14b about each channel while causing the tuning unit 12b to sequentially selecting the transmission channels of a relay station of a viewed program, and compares to determine whether or not a network ID (network_id) contained in the NIT information matches a network ID of a program currently being viewed. When matched, it is determined as the relay station, while not matched, it is determined as not the relay station. Here, the physical channel of the relay station is already described in the NIT information, and the control unit 18 acquires the NIT information about a viewed program and stores the channel information of the relay station into a memory in advance.

After executing the channel search in Step S205, the flow proceeds to Step S206. In Step S206, when a receivable relay station, (except the same channel as that of the viewed program) has been found, the demodulation/diversity combining unit 13 compares the CNR of this relay station with the CNR of the viewed program provided by the tuning unit 12a. As a result of this comparison, if the CNR of the relay station is larger (Yes), the flow proceeds to Step S207. However, other signal quality value besides CNR may be used.

In Step S207, first, the control unit 18 causes the selection unit 16 to select the video/audio signals supplied from the B side, thereby switching to the program of the relay station that was found in the channel search.

Next, the control unit 18 causes the tuning unit 12a to select the same channel as that of the tuning unit 12b. Subsequently, in Step S208, the control unit 18 causes the demodulation/diversity combining unit 13 to perform the diversity combining processing, and output the extracted TS signal to the TS analysis unit 14b. This enables the diversity reception operation to be carried out while switching to the program of the relay station without interrupting the viewed program.

On the other hand, in Step S206, if a relay station, the receiving state of which is better than that of the viewed program, has not been found (No), the flow proceeds to Step S209. In Step S209, the tuning unit 12a for reception and the tuning unit 12b for search are interchanged, whereby the tuning unit 12a is set to the one for search and the tuning unit 12b to the one for reception. Specifically, the control unit 18 causes the tuning unit 12b to select the channel of the viewed program, and also causes the selection unit 16 to select the video/audio signals supplied from the B side.

Subsequently, the flow transitions to Step S210, where the control unit 18 acquires the NIT information of each channel from the TS analysis unit 14a and searches a relay station while causing the tuning unit 12a to sequentially select the transmission channels of a relay station, as in Step S205.

After executing the channel search of Step S210, the flow proceeds to Step S211. In Step S211, as in Step S206, when a receivable relay station (except the same channel as that of the viewed program) has been found, the demodulation/diversity combining unit 13 compares the CNR of this relay station with the CNR of the viewed program provided by the tuning unit 12b. As a result of this comparison, if the CNR of the relay station is larger (Yes), the flow proceeds to Step S207. In Step S207, first, the control unit 18 causes the selection unit 16 to select the video/audio signals supplied from the A side, thereby switching to the program of the relay station that was found in the channel search.

Next, the control unit 18 causes the tuning unit 12b to select the same channel as that of the tuning unit 12a. Subsequently, in Step S208, the control unit 18 causes the demodulation/diversity combining unit 13 to perform the diversity combining processing and output the extracted TS signal to the TS analysis unit 14a. This enables the diversity reception operation to be carried out while switching to the program of the relay station without interrupting the viewed program.

On the other hand, in Step S211, if a relay station, the receiving state of which is better than that of the viewed program, has not been found (No), the flow proceeds to Step S212. In Step S212, the control unit 18 causes the tuning unit 12a for search to select the same channel as that of the tuning unit 12b for reception. Then, the low proceeds to Step S208, where the control unit 18 causes the demodulation/diversity combining unit 13 to perform the diversity combining processing and output the extracted TS signal to the TS analysis unit 14b. Thus, the operation can be returned to the normal diversity reception operation without interrupting the viewed program.

After the processing in Step 208, the flow returns to Step S203, and the processings of Steps S203 to S212 are repeatedly executed. Thus, the channel search can be periodically executed when the receiving state of the radio wave of a viewed program has deteriorated. Therefore, when traveling across a plurality of receiving areas, every time a movable body moves between the receiving areas, the channel of a relay station receivable in the relevant receiving area can be automatically selected to allow for the continuous program viewing.

As described above, according to this embodiment, when the receiving state of the radio wave of a viewed program deteriorates and the condition to start the channel search is satisfied, two tuning units are divided into the one for reception and the one for search and further the diversity combining processing is stopped, thereby while continuing to view the program with the tuning unit of one of the receiving systems, a channel of the receivable relay station can be searched with the tuning unit of the other receiving system. Moreover, at this time, if the relay station has not been found, the tuning unit for reception and the tuning unit for search are interchanged to perform the channel search again, so that the receiver apparatus of the embodiment has the potential to be able to find a receivable relay station as compared with the case where the channel search is carried out only by one of the tuning units.

Embodiment 2

Figure 4:
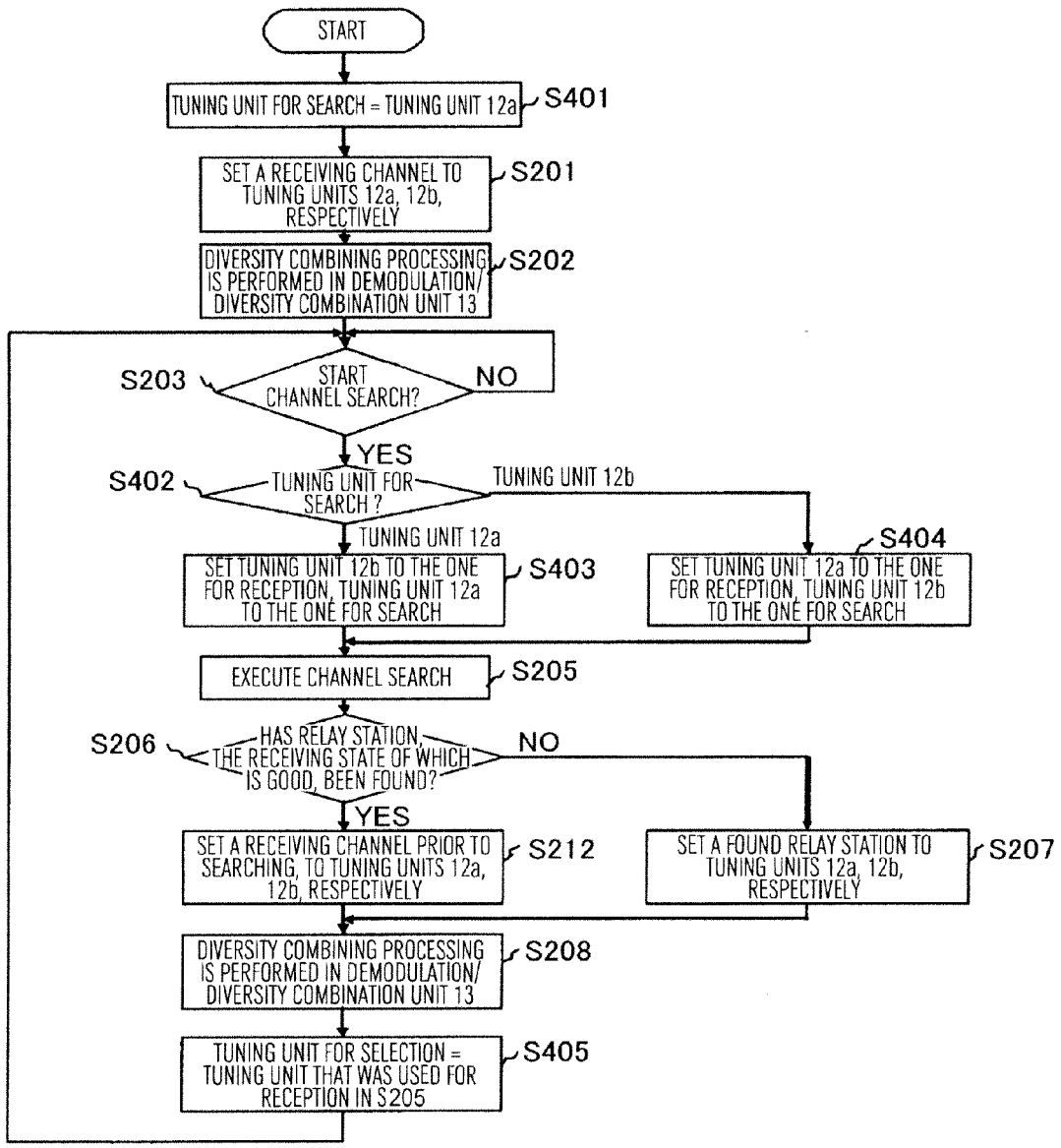
FIG. 4 is a low chart showing the operation of the control unit 18 in a second embodiment of the present invention.

FIG. 4 is a flow chart showing the operation of the control unit 18 in a second embodiment of the present invention.

In the second embodiment, the channel search using either one of the tuning units is regarded as one set, and this one set of channel search is periodically executed when the receiving state of the radio wave of a viewed program deteriorates (in the first embodiment, the tuning units 12a and 12b are alternately set as the tuning unit for search, respectively, and a total of two times of channel searches are regarded as one set).

In the flow chart of FIG. 4, first, in Step S401 the fact that the tuning unit 12a is used as the tuning unit for search is stored. The tuning unit 12a is just an example, and the tuning unit 12b may be used.

Next, in Steps S201 and 8202, as with the first embodiment, the diversity combining reception using the tuning units 12a and 12b is carried out, and the selection unit 16 selects the video/audio signals on the A side and outputs the video/audio signals.

If the condition to start the channel search is satisfied in Step S203, then next, in Step S402, it is determined whether a tuning unit set as the tuning unit for search is the tuning unit 12a or the tuning unit 12b. Here, because the fact that the tuning unit 12a is used as the tuning unit for search is already stored in Step S401, the flow proceeds to Step S403.

In Step S402, if the tuning unit for search is the tuning unit 12a, the flow proceeds to Step S403, where the tuning unit 12b is set for reception and the tuning unit 12a is set for search. Specifically, the control unit 18 causes the tuning unit 12b to continuously receive the channel of the viewed program, and also causes the selection unit 16 to select the video/audio signals supplied from the B side Then, in Step S205, the control unit 18 acquires the NIT information of each channel from the TS analysis unit 14a and searches a relay station while causing the tuning unit 12a to sequentially select the transmission channels of a relay station.

On the other hand, in Step S402, if the tuning unit for search is the tuning unit 12b, the flow proceeds to Step S404, where the tuning unit 12a is set for reception and the tuning unit 12b is set for search. Specifically, the control unit 18 causes the tuning unit 12a to continuously receive the channel of the viewed program, and also causes the selection unit 16 to select the video/audio signals supplied from the A side. Then, in Step S205, the control unit 18 acquires the NIT information of each channel from the TS analysis unit 14b and searches a relay station while causing the tuning unit 12b to sequentially select the transmission channels of a relay station.

Subsequently, Steps S207, S208, and S212 after Step S206 are the same as those of the first embodiment, so the description thereof is omitted.

In Step S405 following Step S208, the fact that the tuning unit, which was used for reception as the tuning unit for search in Step S205, is set as the tuning unit for search is stored. After executing Step S405, the flow returns to Step S203.

As described above, according to this embodiment, when the receiving state of the radio wave of a viewed program deteriorates, two tuning units are divided into the one for reception and the one for search, thereby a channel of a receivable relay station can be searched while continuing to view the program. Moreover, because the channel search using either one of the tuning units is periodically and alternately executed, the processing time can be reduced to a half of the first embodiment wherein the channel search is carried out with respect to both the tuning units, respectively. Thus, in a receiving environment with no channel of a relay station, the receiving state of which is better than that of the current receiving channel, an unnecessary tune spent on the channel search can be reduced and a longer time for program viewing by the diversity combining reception can be secured.

Embodiment 3

In the first embodiment of the present invention, when the receiving state of a radio wave in the tuning unit for reception is bad in interchanging the tuning units for reception and for search and executing the channel search, the reception of a viewed program might be interrupted during the channel search.

Similarly, in the second embodiment of the present invention, when the receiving state of a radio wave in a tuning unit assigned to the tuning unit for reception is bad in setting either one of the tuning units to the tuning unit for reception, the reception of a viewed program might be interrupted during the channel search.

Figure 5:
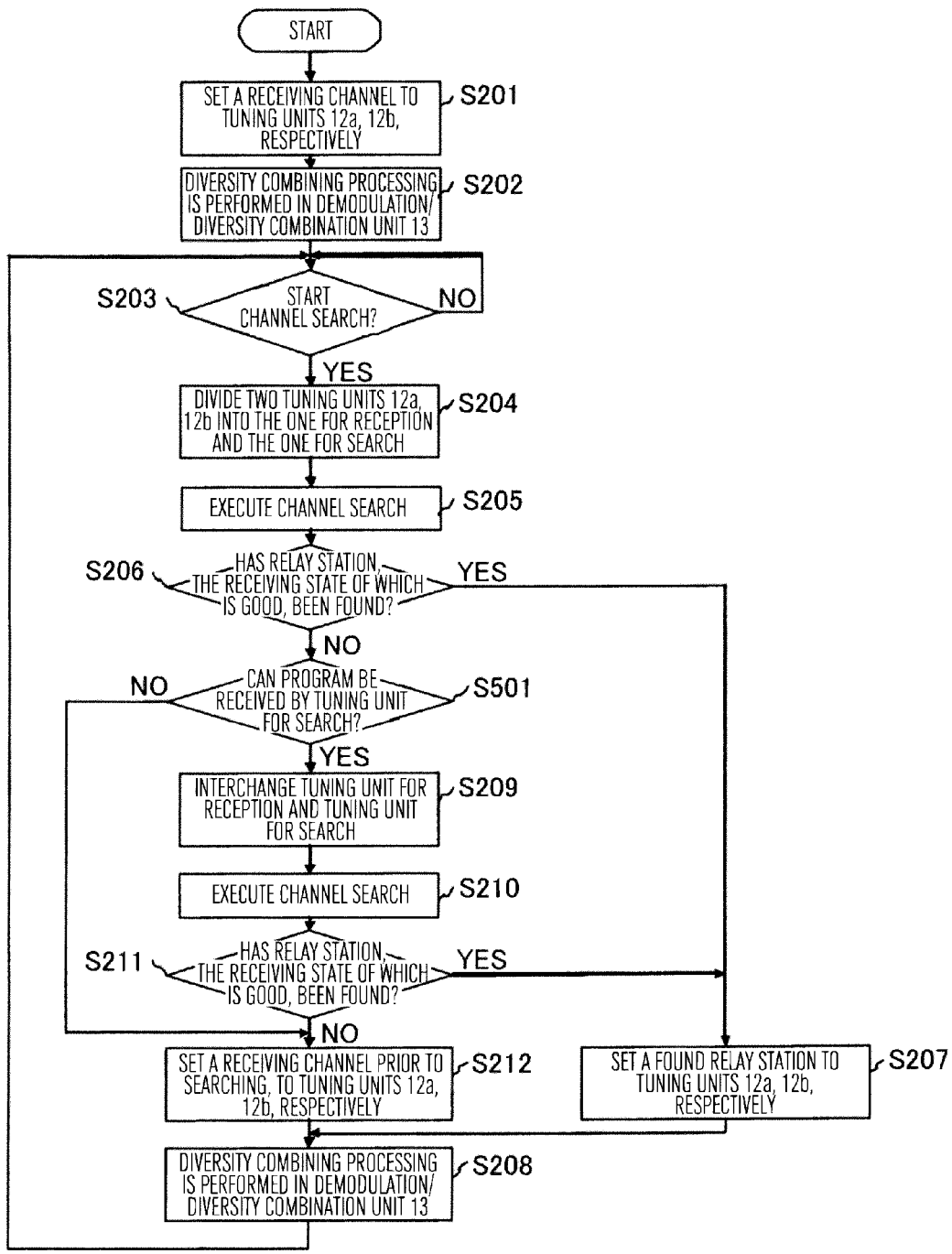
FIG. 5 is a flow chart showing the operation of the control unit 18 in a third embodiment of the present invention, which is prepared based on FIG. 2.
Figure 6:
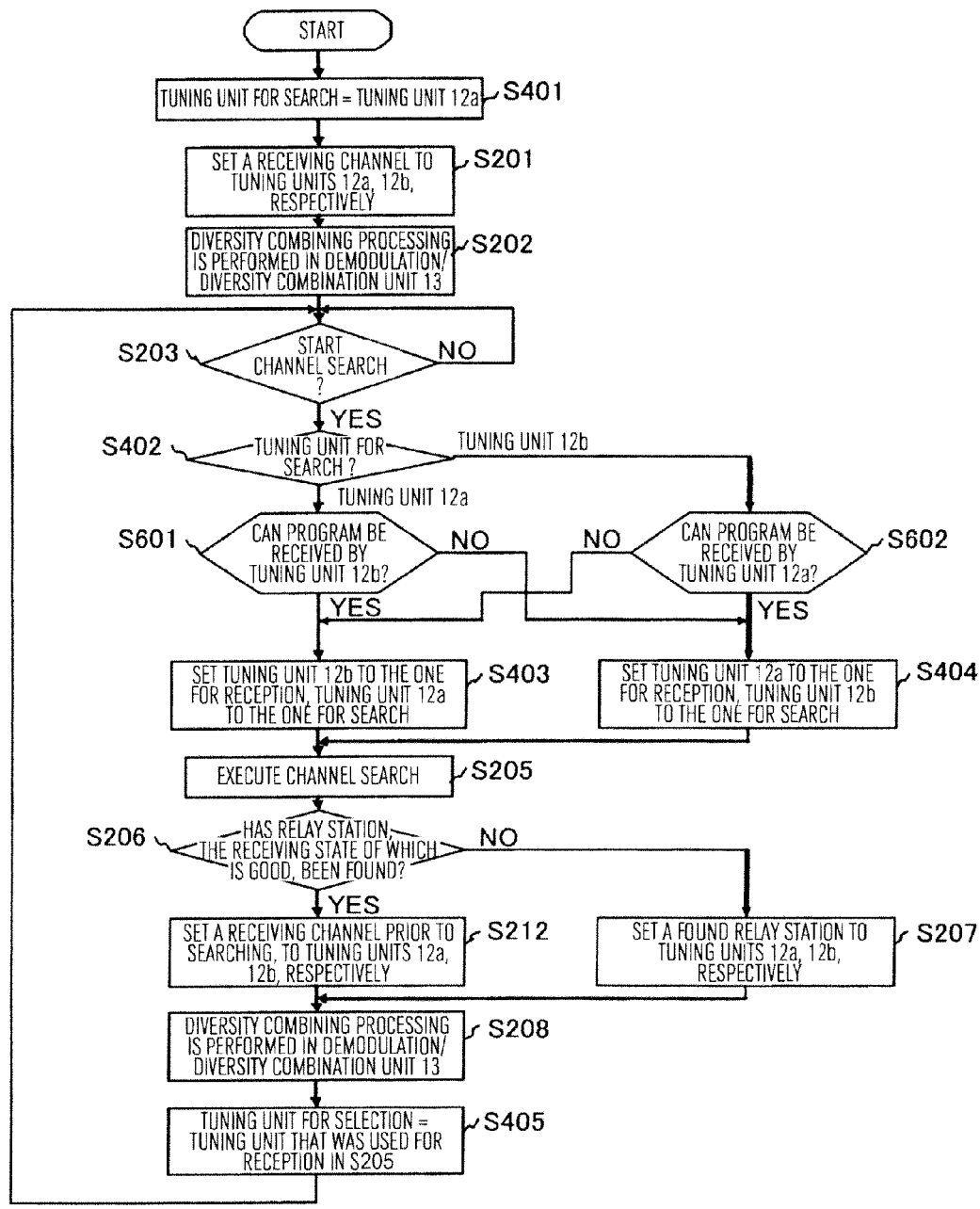
FIG. 6 is a flow chart showing the operation of the control unit 18 in a third embodiment of the present invention, which is prepared based on FIG. 4.

FIG. 5 and FIG. 6 are flow charts showing a third embodiment for correcting the above-described problems.

FIG. 5 is the flow chart of the FIG. 1 showing the operation of the control unit 18 in the first embodiment added by a processing of Step 501.

In this view, in Step S501, the control unit 18 causes the tuning unit for search to select the channel of a viewed program, and acquires the signal quality value of a channel signal, which is supplied from the tuning unit for search, from the demodulation/diversity combining unit 13. Then, it is determined based on the acquired signal quality value whether or not the one-segment broadcast or the 12-segment broadcast can be received, and if receivable (Yes), the flow proceeds to Step S209, while if not receivable (No), the flow proceeds to Step S212.

Thus, before the tuning units for reception and for search are interchanged and the channel search is executed, it is determined in advance whether or not a viewed program can be received in a tuning unit, which is to serve as the tuning unit for reception after being interchanged, and if not receivable (No), the channel search cannot be executed.

FIG. 6 is the flow chart of the FIG. 2 showing the operation of the control unit 18 in the second embodiment added by processings of Steps 601 and 602.

In Step S402, if the tuning unit set as the tuning unit for search is the tuning unit 12a, the flow proceeds to Step S601. In Step S601, it is determined whether or not the tuning unit for reception 12b can receive a program. Specifically, the control unit 18 causes the tuning unit 12b to select the channel of the viewed program, and acquires the signal quality value of a channel signal, which is supplied from the tuning unit 12b, from the demodulation/diversity combining unit 13. Then, it is determined based on the acquired signal quality value whether or not the one-segment broadcast or the id-segment broadcast can be received. If receivable (Yes), the flow proceeds to Step S403, where the tuning unit 12b is set for reception and the tuning unit 12a is set for search and the channel search is executed. Moreover, if not receivable (No), the flow proceeds to Step S404, where the tuning unit for search and the tuning unit for reception are interchanged, and the tuning unit 12a is set for reception and the tuning unit 12b is set for search and the channel search is executed.

On the other hand, in Step S402, if the tuning unit set as the tuning unit for search is the tuning unit 12b, the flow proceeds to Step S602. In Step S602, it is determined whether or not the tuning unit for reception 12a can receive the program. Specifically, the control unit 18 causes the tuning unit 12a to select the channel of the viewed program, and acquires the signal quality value of a channel signal, which is supplied from the tuning unit 12a, from the demodulation/diversity combining unit 13. Then, it is determined based on the acquired signal quality value whether or not the one-segment broadcast or the 12-segment broadcast can be received. If receivable (Yes), the flow proceeds to Step S404, where the tuning unit 12a is set for reception and the tuning unit 12b is set for search and the channel search is executed Moreover, if not receivable (No), the flow proceeds to Step S403, where the tuning unit for search and the tuning unit for reception are interchanged, and the tuning unit 12b is set for reception and the tuning unit 12a is set for search and the channel search is executed.

In this manner, if the receiving state of the radio wave of the tuning unit used for reception is bad, the assigning of the tuning units for reception and for search is interchanged, and the channel search is executed, thereby preventing the viewed program from becoming unreceivable in executing the channel search.

Embodiment 4

In the channel search in the first to third embodiments of the present invention, the process of searching a relay station of a viewed program has been described, but not limited to a relay station, and a process of searching an affiliate station of a viewed program can be added if a relay station has not been found.

Figure 7:
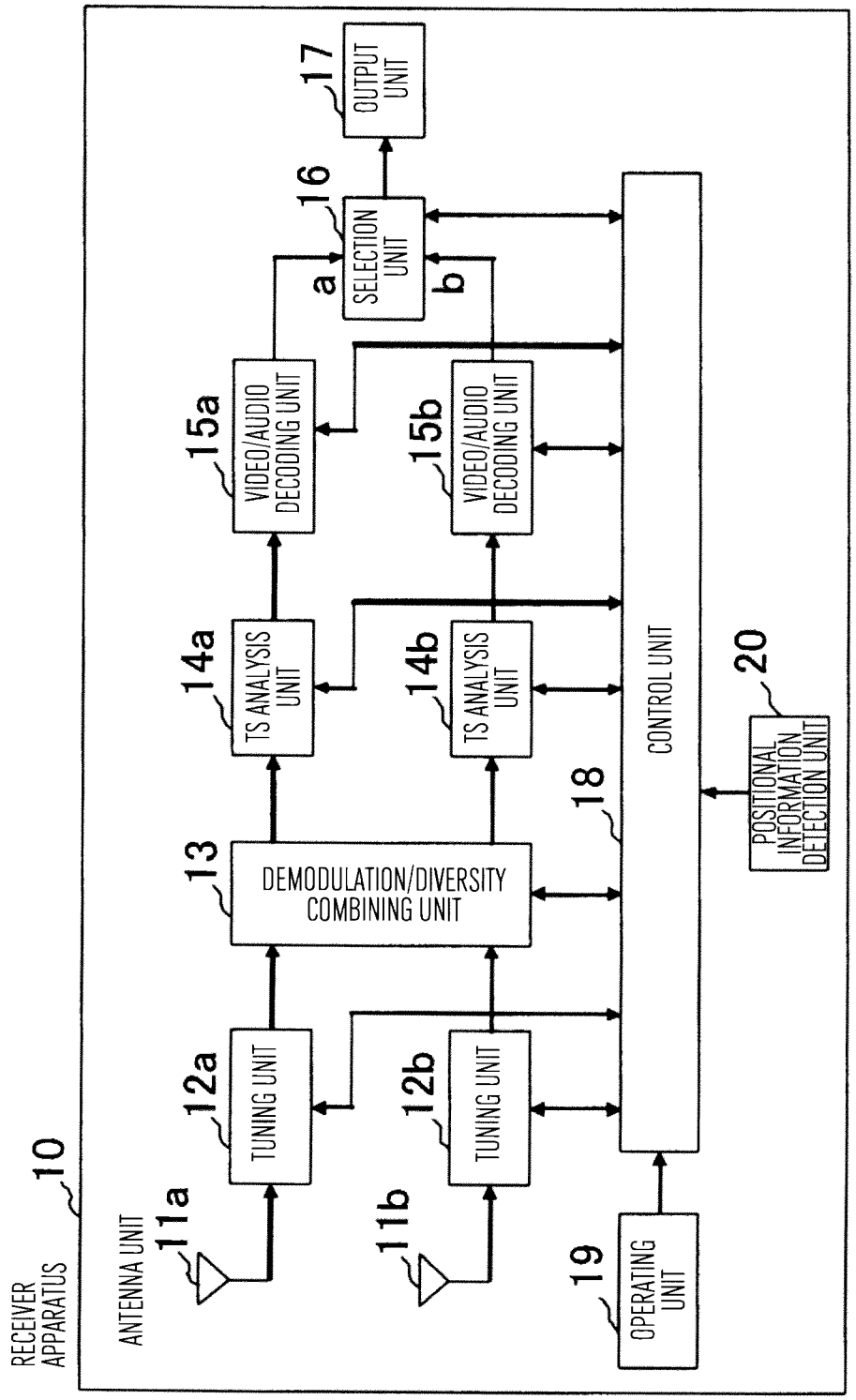
FIG. 7 is a block diagram showing the configuration of the receiver apparatus 10 in a fourth embodiment of the present invention.

FIG. 7 shows the configuration of the receiver apparatus 10 shown in FIG. 1 added by a positional information detection unit 20 capable of acquiring the current position of a vehicle using a GPS (Global Positioning System) or the like. Moreover, FIG. 8 shows a data base that is stored into the control unit 18 in advance, wherein reference sign 801 represents a broadcast station data base having stored therein information, such as the group identifier of each broadcast station and the transmission channels of a relay station, in the unit of broadcast area, and reference sign 802 represents a neighboring area data base having stored therein the information about neighboring areas for each area.

Figure 9:
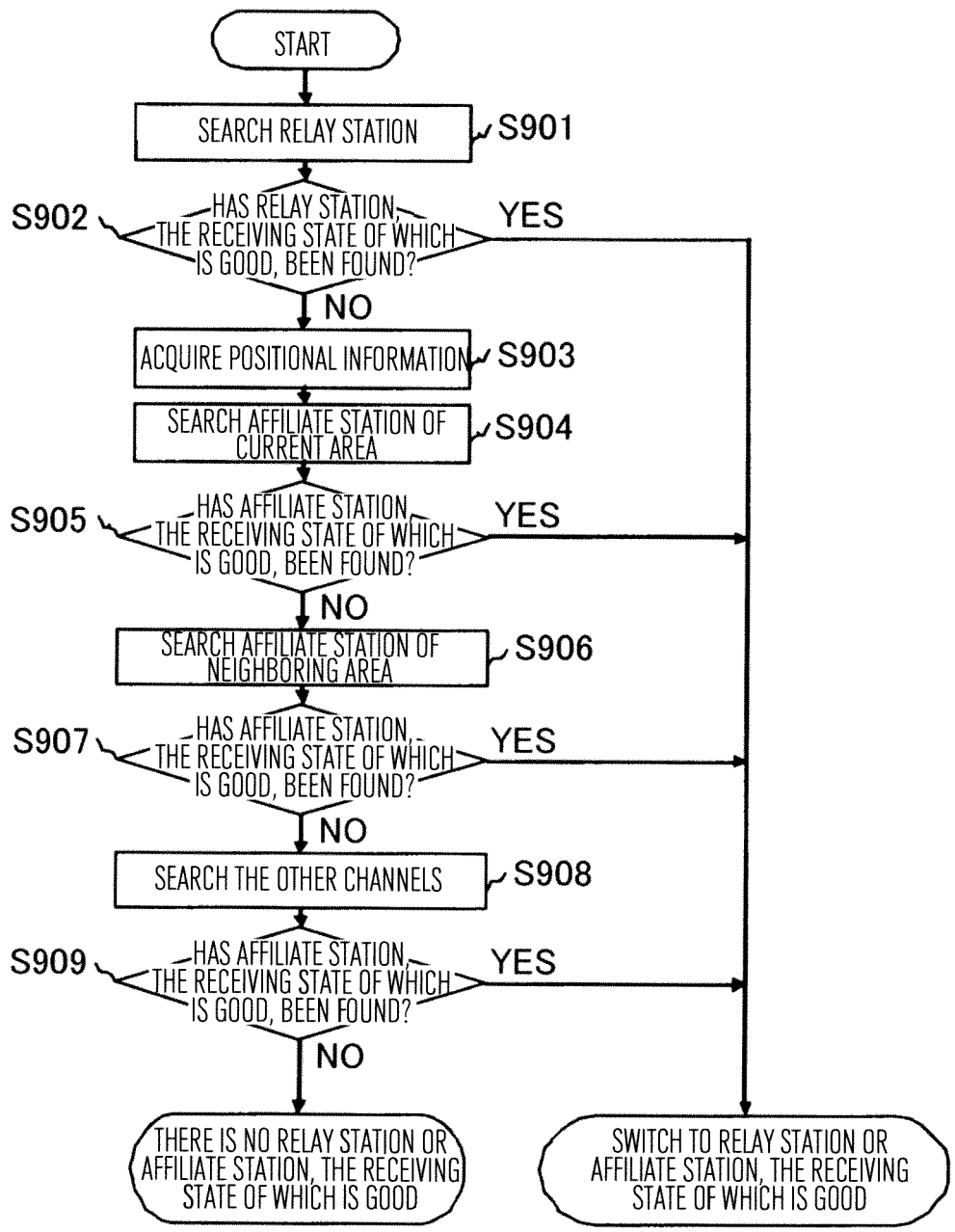
FIG. 9 is a flow chart showing the operation of the control unit 18 in the fourth embodiment of the present invention.

FIG. 9 is a flow chart showing the execution procedure of channel search in a fourth embodiment (corresponding to the processings of Steps S205 and S210 of FIG. 2 in the first embodiment).

In this view, after starting the channel search, the control unit 18, as with the first to third embodiments, first in Step S901, searches the channels of a relay station of a viewed program using the tuning unit for search, and subsequently, in Step S902, it is determined whether or not a relay station, the signal quality value of which is better than that of the viewed program currently being received by the tuning unit for reception, has been found. If found (Yes), the channel search processing is terminated and subsequently switched to the reception of the relevant relay station. If not found (No), the flow proceeds to Step S903, and then a process of searching an affiliate station is carried out.

In Step S903, the control unit 18 acquires the current positional information of the vehicle from the positional information detection unit 20. Next, in Step 904, the control unit 18 investigates, from the broadcasting station data base 801, an affiliate station (a broadcast station with the same group identifier as the viewed program) whose current position is in the broadcast area, first. Then, the control unit 18 extracts the transmission channels of a relay station of this broadcast station, and acquires a BIT (Broadcaster information Table) about each channel from the TS analysis unit while causing the tuning unit for search to select these channels, and can determine that this relay station is an affiliate station if the group identifier contained in the BIT matches the group identifier of the viewed program. For example, when the current position is in Miyagi-prefecture and a viewer is viewing a broadcast station of the Tokyo Broadcasting System group (group identifier=3), Channels 18, 19, 22, 23, 27, 44, and 45, which are the transmission channels of the relay station of TBC Television, are extracted from the broadcasting station data base 801, and these channels will be sequentially searched. Then, in Step S905, it is determined whether or not an affiliate station, the signal quality value of which is better than the viewed program currently being received by the tuning unit for reception, has been found. If found (Yes), the channel search processing is terminated and subsequently switched to the reception of the relevant relay station. If not found (No), the flow proceeds to Step S906.

In Step S906, the control unit 18 investigates the neighboring areas of the current position from the neighboring area data base 802, first. Then, with regard to each neighboring area, the transmission channels of an affiliate station having this area as the broadcast area are extracted from the broadcasting station data base 801, and an affiliate station is searched while causing the tuning unit for search to select these channels. For example, if the current position, is in Miyagi-prefecture and a viewer is viewing a broadcast station of the Tokyo Broadcasting System group (group identifier=3), then Iwate, Fukushima, and Yamagata, which are the neighboring areas of Miyagi, are extracted from the neighboring area data base 802, first. Then, from the broadcasting station data base 801, if there is a broadcast station with the group identifier=3 among these three areas, the transmission channels of this broadcast station are extracted and are sequentially searched. Then, in Step S907, as in Step S905, it is determined whether or not an affiliate station, the signal quality value of which is better than a viewed program currently being received by the tuning unit for reception, has been found. If found (Yes), the channel search processing is terminated and subsequently switched to the reception of the relevant relay station. If not found (No), the flow proceeds to Step S908.

In Step S908, the control unit 18 sequentially searches the channels, among Channel 13 to Channel 62 of the terrestrial digital broadcasting, which have not yet been searched in the above-described search processings (Steps S901, S904, and S906). Then, in Step S909, as in Step S905, it is determined whether or not an affiliate station, the signal quality value of which is better than a viewed program currently being received by the tuning unit for reception, has been found. If found (Yes), the channel search processing is terminated and subsequently switched to the reception of the relevant relay station. If not found (No), it is determined that a channel of a relay station or an affiliate station, the receiving state of which is better than that of the currently viewed program, has not been found, and the channel search is terminated.

As described above, if an affiliate station is continuously searched when a relay station has not been found in the channel search, then even in traveling across the broadcast areas, the reception can be continued by smoothly switching the channel to the affiliate station. Moreover, the positional information of a vehicle, the broadcasting station data base 801, and the neighboring area data base 802 are interlocked, and the affiliate stations are searched in the order from an affiliate station that broadcasts at a location near the current position, thereby allowing the affiliate stations to be efficiently searched. Note that, as the method of searching affiliate stations described in this embodiment, a method of sequentially searching Channel 13 to Channel 62, which are used in the terrestrial digital broadcasting, one by one may be employed for simplification.

Embodiment 5

In the first to fourth embodiments of the present invention, the channel search processing has been described, in which a relay station or an affiliate station of a viewed program is searched. However, a process of preparing a list of broadcast stations receivable at the current position of a vehicle (hereinafter, this is referred to as a channel scan process) can be also realized.

Figure 10:
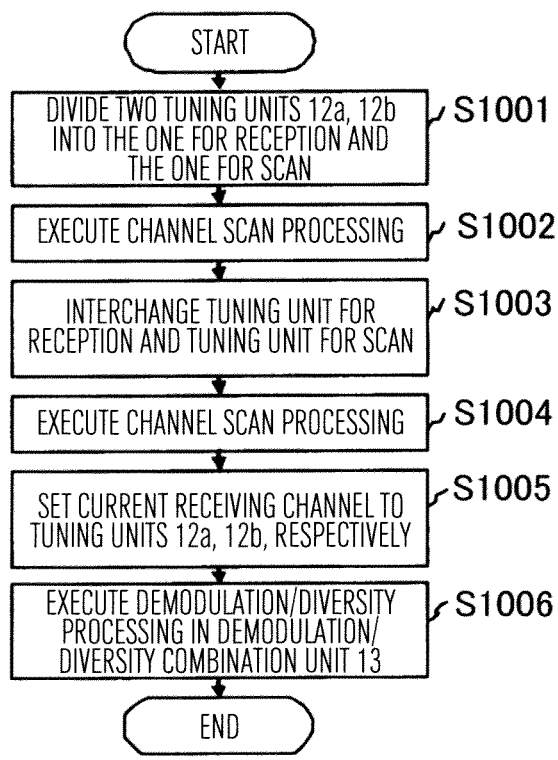
FIG. 10 is a flow chart showing the operation of the control unit 18 in a fifth embodiment of the present invention.

FIG. 10 is a flow chart showing the procedure of the channel scan processing of the receiver apparatus 10.

This flow chart starts, for example, if the following conditions are obtained: when an operation to execute the channel scan processing has been performed by a user from the operating unit 19; or when the fact that a vehicle moved to another broadcast area has been detected by acquiring the current position of the vehicle by the positional information detection unit 20; or furthermore when the control unit 18 determines that the receiving state of the radio wave of a viewed program is good.

Hereinafter, the operation procedure of the channel scan processing is described.

First, while the receiver apparatus 10 is carrying out the diversity reception operation, the control unit 18 causes the demodulation/diversity combining unit 13 to stop the diversity combining processing. In Step S1001, the control unit 18 assigns either one of the tuning unit 12a or 12b to the tuning unit for reception, and assigns the other one to the tuning unit for scan. As the assigning method, the demodulation/diversity combining unit 13 may calculate CNR of the respective channel signals of the tuning units 12a and 12b, and the tuning unit with a higher CNR may be used for reception and the tuning unit with a lower CNR may be used for reception. However, the assigning of the tuning units may be determined using other signal quality value besides CNR. Here, as an example, assume the tuning unit 12a has been assigned to the one for reception and the tuning unit 12b to the one for search.

Next, in Step S1002, the control unit 18 acquires NIT information and the like about each channel from the TS analysis unit 14b while causing the tuning unit 12b to sequentially select Channel 13 to Channel 62, which are used in the terrestrial digital broadcasting, and prepares a list of receivable broadcast stations based on these pieces of information.

Upon completion of the channel scan processing of Step S1002, in Step S1003 the tuning unit 12a for reception and the tuning unit 12b for scan are interchanged, whereby the tuning unit 12a is set to the one for scan and the tuning unit 12b to the one for reception. Specifically, the control unit 18 causes the tuning unit 12b to select the channel of a viewed program, and also causes the selection unit 16 to select the video/audio signals supplied from the B side.

Then, the flow transitions to Step S1004, where the control unit 18 acquires NIT information and the like about each channel from the TS analysis unit 14a while causing the tuning unit 12a to sequentially select Channel 13 to Channel 62 that are used in the terrestrial digital broadcasting. If a channel, which has not yet been registered in the list of broadcast stations, has been found based on these pieces of information, this channel is added to and registered into the list of broadcast stations.

Upon completion of the channel scan processing of Step S1004, in Step S1005 the control unit 18 causes the tuning unit 12a to select a program having the same channel as that of the tuning unit 12b, and subsequently, in Step S1006, the control unit 18 causes the demodulation and diversity combining unit 13 to perform the diversity combining processing and output the extracted TS signal to the TS analysis unit 14b, Thus, the receiver apparatus 10 returns to the diversity reception operation. At this time, the selection unit 16 has already selected the video/audio signals supplied from the B side, so these video/audio signals differ from those supplied from the A side that had been selected before starting the channel scan process.

As described above, according to the embodiment, by dividing two tuning units into the one for reception and the one for scan, a list of broadcast stations receivable at the current position of a vehicle can be prepared while continuing to view the program. At this time, even if there is a broadcast station that has not been found by the channel scan processing by one of the tuning units, the same channel scan processing is performed also by the other tuning unit, and therefore the embodiment has the potential to be able to find more broadcast stations as compared with the case where the channel scan processing is performed only by one of the tuning units.

As described in the third embodiment, if a viewed program cannot be received by the tuning unit for reception in interchanging the tuning unit for reception and the tuning unit for scan in Step S1003, then by omitting the processing of Step S1004, the reception of the viewed program may be prioritized rather than performing the channel scan.

Embodiment 6

Moreover, a process (hereinafter, a channel scan process) of preparing an electronic program guide EPG (Electronic Program Guide) for displaying program contents can be also realized.

Figure 11:
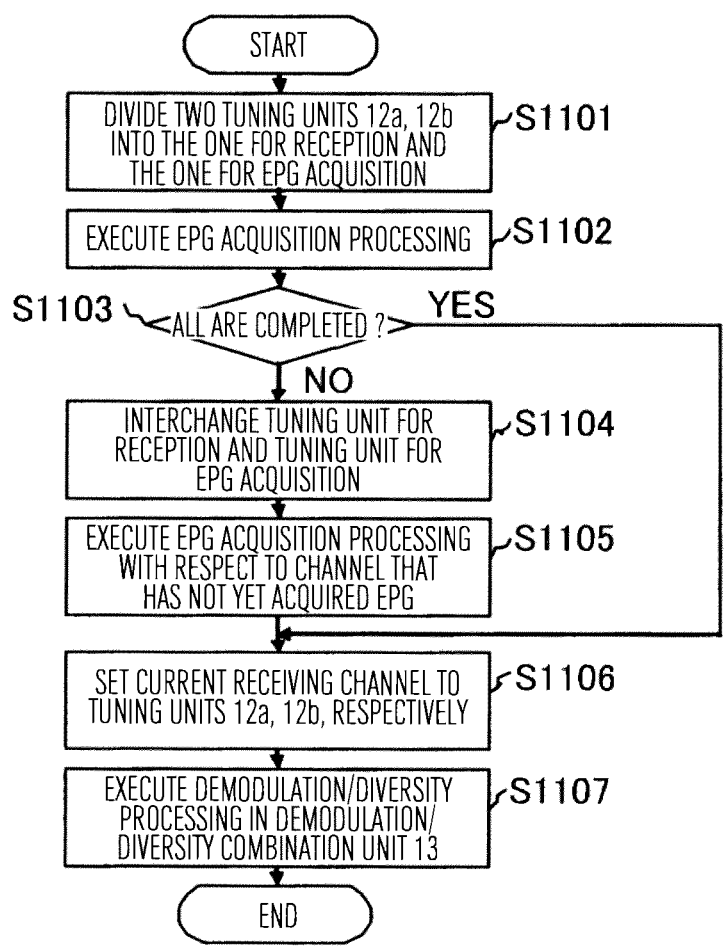
FIG. 11 is a flow chart showing the operation of the control unit 18 in a sixth embodiment of the present invention.

FIG. 11 is a flow chart showing the procedure for acquiring the EPG information of the receiver apparatus 10.

The flow chart starts, for example, if the following conditions are obtained: when an operation to instruct to display EPG by a user is performed from the operating unit 19, or when the control unit 18 determines that the receiving state of the radio wave of a viewed program is good (for example, when the signal quality value is large than the threshold value A in FIG. 3).

Hereinafter, the operation procedure for acquiring the EPG information is described.

First, while the receiver apparatus 10 is carrying out the diversity reception operation, the control unit 18 causes the demodulation/diversity combining unit 13 to stop the diversity combining processing. In Step S1101, the control unit 18 assigns either one of the tuning unit 12a or 12b to the tuning unit for reception, and assigns the other one to the tuning unit for EPG acquisition. As the assigning method, the demodulation/diversity combining unit 13 may calculate CNR of the respective channel signals of the tuning units 12a and 12b, and the tuning unit with a higher CNR may be used for reception and the tuning unit with a lower CNR may be used for EPG acquisition. However, the assigning of the tuning units may be determined using other signal quality value besides CNR. Here, for example, assume the tuning unit 12a has been assigned to the one for reception and the tuning unit 12b to the one for EPG acquisition.

Next, in Step S1102, the control unit 18 acquires, from the TS analysis unit 14b, EIT (Event information Table) information and the like necessary for displaying EPG about each channel, while causing the tuning unit 12b to sequentially select the channels of a broadcast station registered in the receiver apparatus 10, and the EPG of each broadcast station is prepared based on these pieces of information.

Upon completion of the EPG acquisition processing of Step S1102, it is determined in Step S1103 whether or not all the EPG information of a registered broadcast station could be acquired. If acquired (Yes), the flow transitions to Step S1106, while if not acquired (No), the flow proceeds to Step S1104.

In Step S1104, the tuning unit 12a for reception and the tuning unit 12b for EPG acquisition are interchanged, whereby the tuning unit 12a is set to the one for EPG acquisition and the tuning unit 12b is set to the one for reception Moreover, the control unit 18 causes the selection unit 16 to select the video/audio signals supplied from the B side.

Then, the flow transitions to Step S1105, where the control unit 18 acquires the EIT information and the like about each channel from the TS analysis unit 14a while causing the tuning unit 12a to sequentially select the channels of a broadcast station, the EPG information of which could not be acquired in Step S1102, and the EPG of each broadcast station is prepared based on these pieces of information.

Upon completion of the EPG acquisition processing of Step S1105, in Step S1106 the control unit 18 causes the tuning unit 12a to select a program having the same channel as that of the tuning unit 12b, and subsequently in Step S1107, the control unit 18 instructs the demodulation/diversity combining unit 13 to perform the diversity combining processing. Thus, the receiver apparatus 10 returns to the diversity reception operation. At this time, the selection unit 16 has already selected the video/audio signals supplied from the B side, so these video/audio signals differ from those supplied from the A side that had been selected before starting the channel scan process.

As described above, according to the embodiment, by dividing two tuning units into the one for reception and the one for EPG acquisition, the EPG of a broadcast station registered in the receiver apparatus 10 can be prepared while continuing to view the program. At this time, even if the EPG information could not be acquired by the EPG acquisition processing performed by one of the tuning units, the other tuning unit also performs the EPG acquisition processing, and therefore EPG can be prepared more reliably as compared with the case where the EPG acquisition processing is performed only by one of the tuning units.

Moreover, as described in the third embodiment, if a viewed program cannot be received by the tuning unit for reception in interchanging the tuning unit for reception and the tuning unit for EPG acquisition in Step S1104, then by omitting the processing of Step 1004, the reception of the viewed program may be prioritized rather than performing the EPG acquisition process.

Embodiment 7

Figure 12:
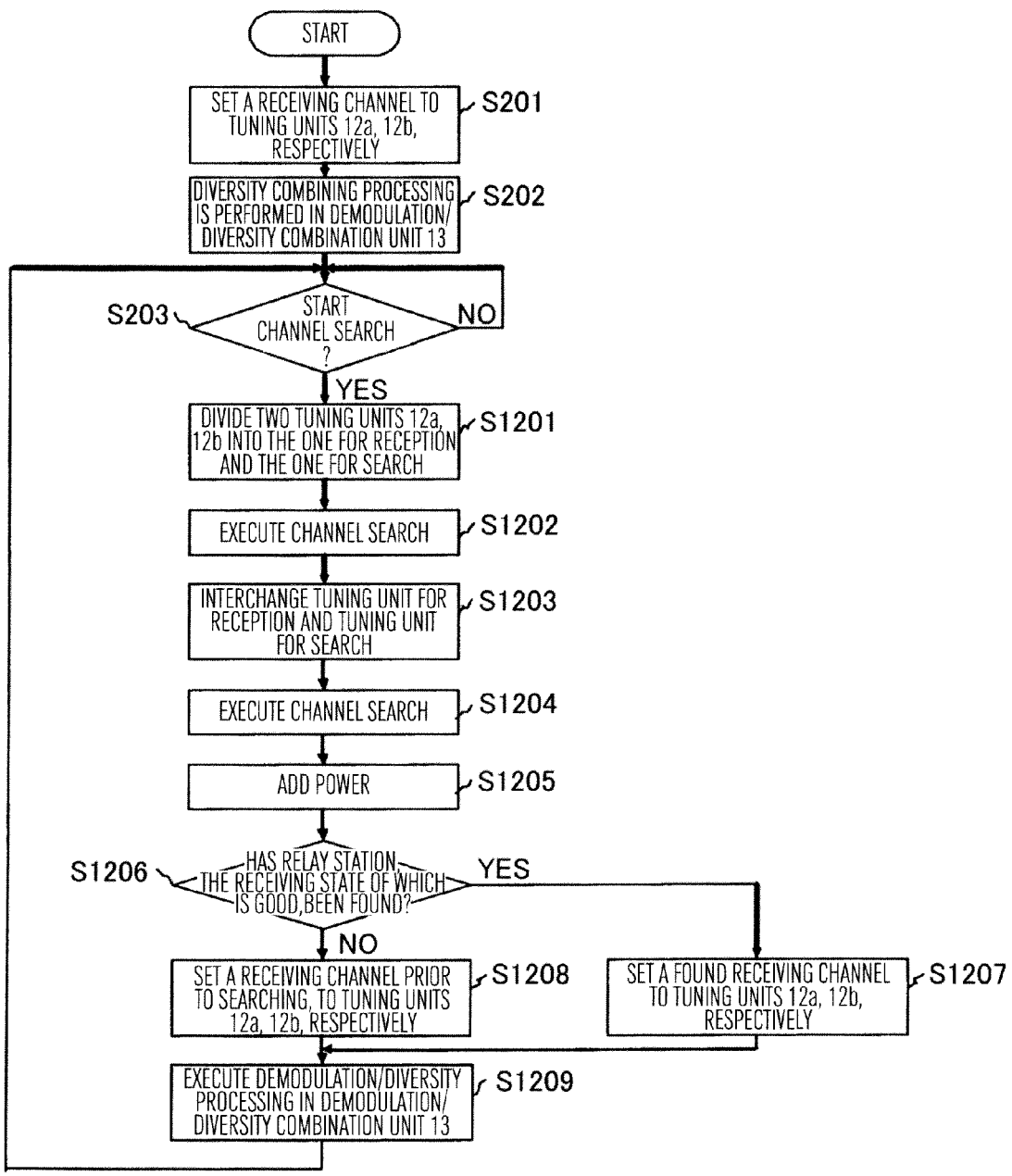
FIG. 12 is a flow chart showing the operation of the control unit 18 in a seventh embodiment of the present: invention.

FIG. 12 is a flow chart showing the operation of the control unit 18 in a seventh embodiment of the present invention. Once the channel selection information is supplied from the operating unit 19 to the control unit 18 by a user's channel selection operation, this flow chart starts, and first, as with the first embodiment, in Step S201, the control unit 18 sets a corresponding receiving channel to the tuning units 12a and 12b based on the channel selection information supplied from the operation unit 19, respectively. Then, in Step S202, the control unit 18 causes the demodulation/diversity combining unit 13 to perform the diversity combining processing and output the extracted TS signal to the TS analysis unit 14a. Moreover, the control unit 18 causes the selection unit 16 to select the video/audio signals on the A side. Thus, the program reception by the diversity reception operation using two antennas can be performed.

Next, in Step S203, the control unit 18 determines whether or not a condition to start the channel search is satisfied, and when the condition to start the channel search is satisfied (Yes), the flow proceeds to Step S1201, while when the condition to start the channel search is not satisfied (No), the determination processing of Step S203 will be repeated. The determination processing of Step S203 is the same as that of the first embodiment, so the description thereof is omitted.

In Step S1201, the control unit 18 assigns either one of the tuning unit 12a or 12b to the tuning unit for continuous reception and assigns the other one to the tuning unit for channel search. As the assigning method, any method may be employed.

Next, the operation of the channel search in Step S1202 is described. Here, as an example, assume the tuning unit 12a has been assigned to the one for reception and the tuning unit 12b to the one for search in Step 1201.

First, the control unit 18 causes the demodulation/diversity combining unit 13 to stop the diversity combining processing and independently subject the respective channel signals supplied from the tuning units 12a and 12b to the demodulation and the channel decoding.

Next, the control unit 18 acquires the NIT information from the TS analysis unit 14b about each channel while causing the tuning unit 12b to sequentially select the transmission channels of a relay station of a viewed program, and compares to determine whether or not a network ID contained in the NIT information matches a network ID of a program currently being viewed, and if matched, it is determines as the relay station. Here, the physical channel of the relay station is already described in the NIT information, and the control unit 18 acquires the NIT information about a viewed program and stores the channel information of the relay station into a memory in advance.

Figure 13:
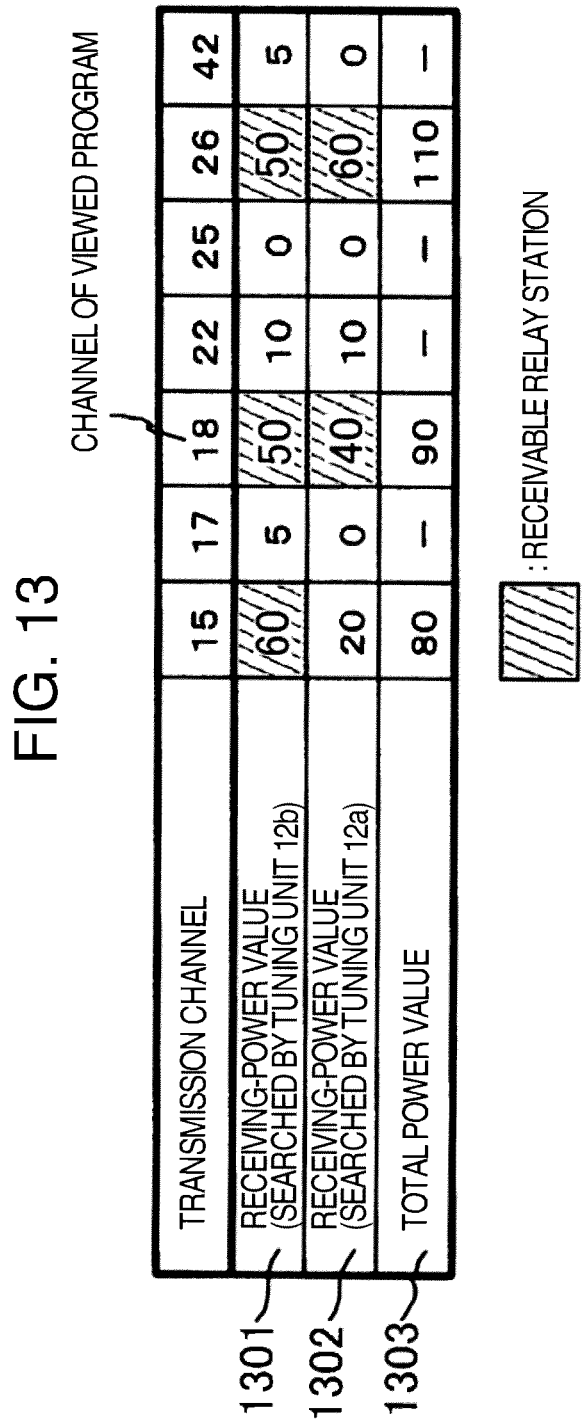
FIG. 13 is a view showing a process of adding powers of the channels that are searched by tuning units 12a and 12b, in the seventh embodiment of the present invention.

Moreover, the control unit 18, as shown in 1301 of FIG. 13, for each channel of a relay station, acquires the received power from the demodulation/diversity combining unit 13 and stores this received power and the information indicating whether or not the relay station could be received into a memory in advance. In an example of reference sign 1301 of FIG. 13, a relay station can be received at Channels 15, 18, and 26.

Next, in Step 1203, the tuning unit 12a for reception and the tuning unit 12b for search are interchanged, whereby the tuning unit 12a is set to the one for search and the tuning unit 12b to the one for reception. Specifically, the control unit 18 causes the tuning unit 12b to select the channel of a viewed program, and also causes the selection unit 16 to select the video/audio signals supplied front the B side.

In Step S1204, the control unit 18 acquires the NIT information of each channel from the TS analysis unit 14a and searches a relay station while causing the tuning unit 12a to sequentially select the transmission channels of a relay station, as in Step S1202. Moreover, the control unit 18, as shown by reference sign 1302 of FIG. 13, for each channel of a relay station, acquires the received power from the demodulation/diversity combining unit 13 and holds the same in a memory in advance. In an example of reference sign 1302 of FIG. 13, the relay station can be received at Channels 18 and 26.

Subsequently, in Step S1205, as shown by reference sign 1303 (a total power value) of FIG. 13, for the channels (Channels 15, 18, and 26 in the example of FIG. 13) that have been determined as those of a relay station in Step S1202 or S1204, a total power is calculated by adding the received power 1301 (the received power value obtained by the search by the tuning unit 12b) and the received power 1302 (the received power value obtained by the search by the tuning unit 12a). Then, in Step S1206, it is determined whether or not the channel of a relay station, the total power value of which is large than that of a viewed program, has been found in the total power value 1303. If found (Yes), the flow proceeds to Step S1207, while if not found (No), the flow proceeds to Step S1208. In the example of FIG. 13, a total power value of Channel 26 is larger than that of Channel 18 of a viewed program, so the flow proceeds to Step S1207. In Step S1207, first, the control unit 18 causes the timing unit 12a to select the channel of the relay station that was found in the channel search, and causes the selection unit 16 to select the video/audio signals supplied from the A side, thereby switching to the program of a relay station that was found in the channel search. Moreover, a hatched portion indicates a receivable relay channel.

Next, the control unit 18 causes the tuning unit 12b to select the same channel as that of the tuning unit 12a. Subsequently, in Step S1209, the control unit 18 causes the demodulation/ diversity combining unit 13 to perform the diversity combining processing and output the extracted TS signal to the TS analysis unit 14a. This enables the diversity reception operation to be carried out while switching to the program of a relay station without interrupting the viewed program.

On the other hand, in Step S1208, the control unit 18 causes the tuning unit 12a for search to select the same channel as that of the tuning unit 12b for reception. Then, in Step S1209, the control unit 18 causes the demodulation and diversity combining unit 13 to perform the diversity combining processing and output the extracted TS signal to the TS analysis unit 14b. Thus, the operation can be returned to the normal diversity reception operation without interrupting the viewed program.

After the processing of Step 1209, the flow returns to Step S203, and the processings of Step S203 and Steps S1201 to S1209 are repeatedly executed Thus, the channel search can be periodically executed when the receiving state of the radio wave of a viewed program has deteriorated. Therefore, when traveling across a plurality of receiving areas, every time a movable body moves between the receiving areas, the channel of a relay station receivable in the relevant receiving area can be automatically selected and the program can be continuously viewed.

As described above, according to the embodiment, the channel search is executed by both the tuning units 12a and 12b, and the respective results of the channel search are added in power. Accordingly, the channel of a relay station, the receiving state of which becomes good when the diversity operation using the received signal in each tuning unit is performed, can be found.

On the other hand, in order to find the channel of a relay station, the receiving state of which becomes the best when the diversity operation is performed, the operation based on an algorithm similar to the algorithm of the diversity operation in the demodulation/diversity combining unit 13 may be performed. That is, assume the demodulation/diversity combining unit 13 performs a diversity operation using the maximum ratio combining method, for example, then in the channel search by each tuning unit, the information related to a sub-carrier may be stored for each channel, and then, CNR may be calculated by weighting and combining the sub-carriers of the same channel, and a channel having the maximum CNR may be selected.

In the embodiments of the invention shown above, the configuration of the receiver apparatus 10 with two tuning units 10a and 10b has been described, but the receiver apparatus 10 may be configured by three or more tuning units. For example, in the case where the receiver apparatus 10 is configured by four tuning units, usually the diversity reception operation using four tuning units is performed, and in performing the channel search (or the channel scan, or the EPG acquisition processing), two tuning units may he set to the one for reception and the rest may be set to the one for search (or the one for scan or for EPG acquisition).

REFERENCE SIGNS LIST

10 . . . receiver apparatus, 11 . . . antenna unit, 12 . . . tuning unit, 13 . . . demodulation/diversity combining unit, 14 . . . TS analysis unit, 15 . . . video/audio decoding unit, 16 . . . selection unit, 17 . . . output unit, 18 . . . control unit, 19 . . . operating unit, 20 . . . positional information detection unit.

The invention claimed is:

1. A receiver apparatus: comprising:
a first receiving system configured to select a predetermined channel using a reception signal received by an antenna, and to perform demodulation/channel decoding/demultiplexing/decoding processings on a signal of a viewed program of this selected channel, and to output video and audio signals, the first receiving system including a first receiving circuit unit;
a second receiving system configured to select a predetermined channel using a reception signal received by an antenna, and to perform s demodulation/channel decoding/demultiplexing/decoding processings on a signal of a viewed program of this selected channel, and to output video and audio signals, the second receiving system including a second receiving circuit unit;
a selection unit configured to select and output either one of an output of the first receiving circuit unit of the first receiving system and an output of the second receiving circuit unit of the second receiving system;
a demodulation/diversity combining unit configured to combine a demodulated signal of the first receiving system and a demodulated signal of the second receiving system, and to supply this composite signal to either one of the first and second receiving systems; and
a control unit configured to control the first and second receiving systems; and the selection unit, and the demodulation/diversity combining unit, wherein
the control unit includes a control portion configured to cause performance of a diversity reception operation, wherein channel decoding/demultiplexing/decoding processings are performed on the composite signal using either one of the first and second receiving systems and video/audio signals are output, wherein
the control unit includes a control portion configured to execute a first composite operation, wherein when a predetermined condition has been satisfied during the diversity reception operation, either one of the first receiving system and the second receiving system is caused to continuously receive a viewed program as it is while the other receiving system is caused to perform channel search to search a channel satisfying a predetermined condition, and the selection unit is caused to select an output of the receiving system configured to continuously receive the viewed program, wherein
the control unit includes a control portion which, when a channel to be received has not been found as a result of the first composite operation, is configured to execute a second composite operation, wherein the receiving system configured to continuously receive the viewed program and the receiving system configured to perform the channel search are interchanged, and the resulting receiving system configured to perform the channel search is caused to perform the channel search, and the selection unit is caused to select an output of the resulting receiving system configured to continuously receive the viewed program.

2. The receiver apparatus according to claim 1, wherein the control unit further includes a control portion which, when the receiving system configured to continuously receive the viewed program and the receiving system configured to perform the channel search are interchanged, is configured to determine whether or not a relevant viewed program can be received in the resulting receiving system configured to continuously receive the viewed program, and which, only when it is determined in the determination processing as receivable, is configured to execute a second composite operation, wherein a receiving system (a) configured to continuously receive the viewed program and a receiving system (b) configured to perform the channel search are interchanged, and the resulting receiving system configured to perform the channel search is caused to perform a channel search, and the selection unit is caused to select an output of the resulting receiving system configured to continuously receive the viewed program.

3. The receiver apparatus according to claim 1, wherein the control unit includes:
   a plurality of threshold values for determining a receiving state of the viewed program; and
   a control portion configured to set a time interval value configured to perform a numerical counting per between the plurality of threshold values; and the control unit further includes
   a control portion, which during the diversity reception operation, while the receiving state of the viewed program is transitioning between the plurality of threshold values, is configured to perform the numerical counting according to the time interval value, and to start the first composite operation once the numerical counting reaches a predetermined numerical value.

4. The receiver apparatus according to claim 1, wherein the channel satisfying a predetermined condition and being searched in the channel search is a channel of a relay station or an affiliate station of a channel which a receiving system configured to continuously receive the viewed program is currently receiving, wherein
   a receiving state of the relay station or affiliate station is better than that of a channel which a receiving system configured to continuously receive the viewed program is receiving.

5. The receiver apparatus according to claim 1, wherein in the first composite operation, among the first receiving system and the second receiving system, a receiving system having a better receiving state is set to the receiving system configured to continuously receive the viewed program and the other receiving system is set to the receiving system configured to perform the channel search.

6. A receiver apparatus comprising:
   a first receiving system configured to select a predetermined channel using a reception signal received by an antenna, and to perform demodulation/channel decoding/demultiplexing/decoding processings on a signal of a viewed program of this selected channel, and to output video and audio signals;
   a second receiving system configured to select a predetermined channel using a reception signal received by an antenna, and to perform demodulation/channel decoding/demultiplexing/decoding processings on a signal of a viewed program of this selected channel, and to output video and audio signals;
   a selection unit configured to select and output either one of an output of the first receiving circuit unit of the first receiving system and an output of the second receiving circuit unit of the second receiving system;
   a demodulation/diversity combining unit configured to combine a demodulated signal of the first receiving system and a demodulated signal of the second receiving system, and to supply this composite signal to either one of the first and second receiving systems; and
   a control unit configured to control the first and second receiving systems, the selection unit, and the demodulation/diversity combining unit, wherein
   the control unit includes a control portion that is configured to cause performance of a diversity reception operation, wherein channel decoding/demultiplexing/decoding processings are performed on the composite signal using either one of the first and second receiving systems and video/audio signals are output, wherein
   the control unit includes a control portion configured to execute a first composite operation, wherein when a predetermined condition has been satisfied during the diversity reception operation, either one of the first receiving system and the second receiving system is caused to continuously receive a viewed program as it is while the other receiving system is caused to perform channel scan to search a receivable channel, and the selection unit is caused to select an output of the receiving system configured to continuously receive the viewed program, wherein
   the control unit includes a control portion configured to execute a second composite operation, wherein the receiving system configured to continuously receive the viewed program and the receiving system configured to perform the channel scan are interchanged, and the resulting receiving system configured to perform the channel search is caused to perform the channel search, and the selection unit is caused to select an output of the resulting receiving system configured to continuously receive the viewed program.

7. A receiver apparatus comprising:
   a first receiving system configured to select a predetermined channel using a reception signal received by an antenna, and to perform demodulation/channel decoding/demultiplexing/decoding processings on a signal of a viewed program of this selected channel, and to output video and audio signals;
   a second receiving system configured to select a predetermined channel using a reception signal received by an antenna, and to perform demodulation/channel decoding/demultiplexing/decoding processings on a signal of a viewed program of this selected channel, and to output video and audio signals;
   a selection unit configured to select and output either one of an output of the first receiving circuit unit of the first receiving system and an output of the second receiving circuit unit of the second receiving system;
   a demodulation/diversity combining unit configured to combine a demodulated signal of the first receiving system and a demodulated signal of the second receiving system, and to supply this composite signal to either one of the first and second receiving systems; and
   a control unit configured to control the first and second receiving systems, the selection unit, and the demodulation/diversity combining unit, wherein
   the control unit includes a control portion configured to perform a diversity reception operation, wherein a demodulated signal of the first receiving system and a demodulated signal of the second receiving system are combined, and channel decoding/demultiplexing/decoding processings are performed on the composite signal using either one of the first and second receiving systems and video/audio signals are output, wherein
   the control unit includes a control portion configured to execute a first composite operation, wherein when a predetermined condition has been satisfied during the diversity reception operation, either one of the first receiving system and the second receiving system is caused to continuously receive a viewed program as it is while the other receiving system is caused to acquire an EPG about a channel registered in the receiver apparatus, and the selection unit is caused to select an output of the receiving system configured to continuously receive the viewed program, wherein
   the control unit includes a control portion which, when as a result of the first composite operation, the EPG about all the channels registered in a receiver apparatus could not be acquired, is configured to execute a second composite operation, wherein the receiving system configured to continuously receive the viewed program and the receiving system for acquiring the EPG are interchanged, the receiving system for acquiring the EPG is caused to acquire an EPG about a channel which could not be acquired in the first composite operation, and the selection unit is caused to select an output of the resulting receiving system configured to continuously receive the viewed program.

8. A receiver apparatus comprising:
a first receiving system configured to select a predetermined channel using a reception signal received by an antenna, and to perform demodulation/channel decoding/demultiplexing/decoding processings on a signal of a viewed program of this selected channel, and to output video and audio signals;
a second receiving system configured to select a predetermined channel using a reception signal received by an antenna, and to perform demodulation/channel decoding/demultiplexing/decoding processings on a signal of a viewed program of this selected channel, and to output video and audio signals;
a selection unit configured to select and output either one of an output of the first receiving circuit unit of the first receiving system and an output of the second receiving circuit unit of the second receiving system;
a demodulation/diversity combining unit configured to combine a demodulated signal of the first receiving system and a demodulated signal of the second receiving system, and to supply this composite signal to either one of the first and second receiving systems; and
a control unit configured to control the first and second receiving systems, the selection unit, and the demodulation/diversity combining unit, wherein
the control unit includes a control portion configured to perform a diversity reception operation, wherein channel decoding/demultiplexing/decoding processings are performed on the composite signal using either one of the first and second receiving systems and video/audio signals are output, wherein
the control unit, includes a control portion configured to execute a first composite operation, wherein when a predetermined condition has been satisfied during the diversity reception operation, either one of the first receiving system and the second receiving system is caused to continuously receive a viewed program as it is while the other receiving system is caused to perform a channel search to acquire a receiving state of each channel and search a channel satisfying a predetermined condition, and the selection unit is caused to select the output of a receiving system configured to continuously receive the viewed program, wherein the control unit includes:
a control portion configured to execute a second composite operation, wherein the receiving system configured to continuously receive the viewed program and the receiving system configured to perform the channel search are interchanged, the receiving system configured to perform the channel search is caused to perform a channel search to acquire a receiving state of each channel and search a channel satisfying a predetermined condition, and the selection unit is caused to select an output of the resulting receiving system configured to continuously receive the viewed program; and
a control portion configured to combine, for each channel, the receiving state of the each channel obtained by the first composite operation and the second composite operation, and to calculate the receiving state of after combining; and
a control portion configured to set a channel of a viewed program to a channel having the best receiving state after combining, among the channels satisfying the predetermined condition.

9. A receiver apparatus including first and second receiving systems configured to transmit a reception signal received by an antenna, the receiver apparatus being capable of a diversity reception operation by a diversity combining processing of demodulated signals by the first and second receiving systems, the receiver apparatus further including:
a control unit configured to execute a first composite operation, wherein when a condition to start the channel search is satisfied during a diversity reception operation, the diversity combining processing is stopped, and either one of the first and second receiving systems is caused to continuously receive a program selected by the first and second receiving systems while the other one is caused to perform a channel search or to acquire an EPG about a channel registered in the receiver apparatus, and to execute a second composite operation, wherein in the first composite operation, when a channel to be received has not been found, the first and second receiving systems are interchanged, and either one of the first and second receiving systems is caused to perform a channel search while the other one is caused to continuously receive the viewed program or to perform a channel search, or to acquire an EPG about a channel registered in the receiver apparatus.

* * * * *